United States Patent [19]

Ihara et al.

[11] Patent Number: 4,623,884
[45] Date of Patent: Nov. 18, 1986

[54] TRANSMISSION LINE CONTROL SYSTEM WITH BY-PASS CONTROL

[75] Inventors: Susumu Ihara; Shinji Tsunoda, both of Osaka, Japan

[73] Assignee: Sumitomo Electric Industries, Ltd., Osaka, Japan

[21] Appl. No.: 630,304

[22] Filed: Jul. 12, 1984

[30] Foreign Application Priority Data

Aug. 11, 1983 [JP] Japan ................................ 58-147408

[51] Int. Cl.⁴ .............................................. H04J 1/16
[52] U.S. Cl. ................................ 340/825.05; 370/16; 370/86; 371/62
[58] Field of Search ....................... 370/15, 16, 85, 86; 340/825.05, 825.5, 825.51, 825.16; 371/62, 8, 11; 179/175.3 S, 175.2 C

[56] References Cited

U.S. PATENT DOCUMENTS 4,058,681 11/1977 Imaizumi et al. ...................... 370/85
4,159,470  6/1979 Strojny et al. ................. 340/825.05

Primary Examiner—Donald J. Yusko
Assistant Examiner—Sharon Hodgkins
Attorney, Agent, or Firm—Cushman, Darby & Cushman

[57] ABSTRACT

The present invention provides a transmission line control system capable of disconnecting and reconnecting a terminal communication apparatus from and to a main transmission line reliably and quickly at such occasions as a fault in the line, correction of the fault, cutting off and turning on of a power source. The control system according to the present invention includes, for each terminal communication apparatus, two subsidiary communication lines, a by-pass, two signal monitoring devices, and four change-over switches. Each signal monitoring device monitors data signal passing through the subsidiary transmission lines and controls the switching operation of the change-over switches so that, upon occurrence of a line fault or a disconnection of the power source, only the terminal communication apparatus related to the trouble is disconnected from the main transmission line and that, upon correction of the line fault or turning on of the power source, said terminal communication apparatus is reconnected with the main transmission line. In order to perform such control operation properly, constants deciding the lengths of time of operation of the signal monitoring devices are determined to satisfy given inequalities.

6 Claims, 20 Drawing Figures

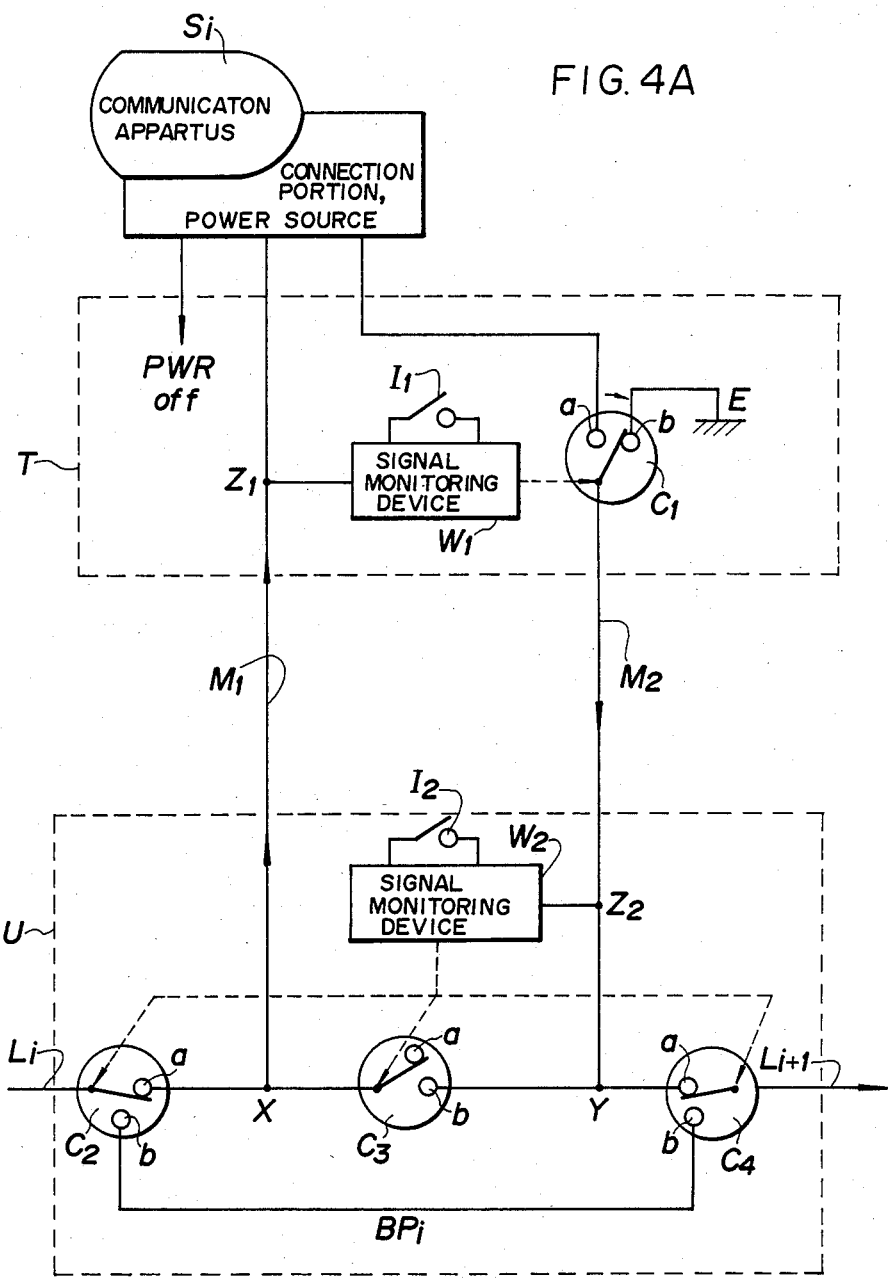

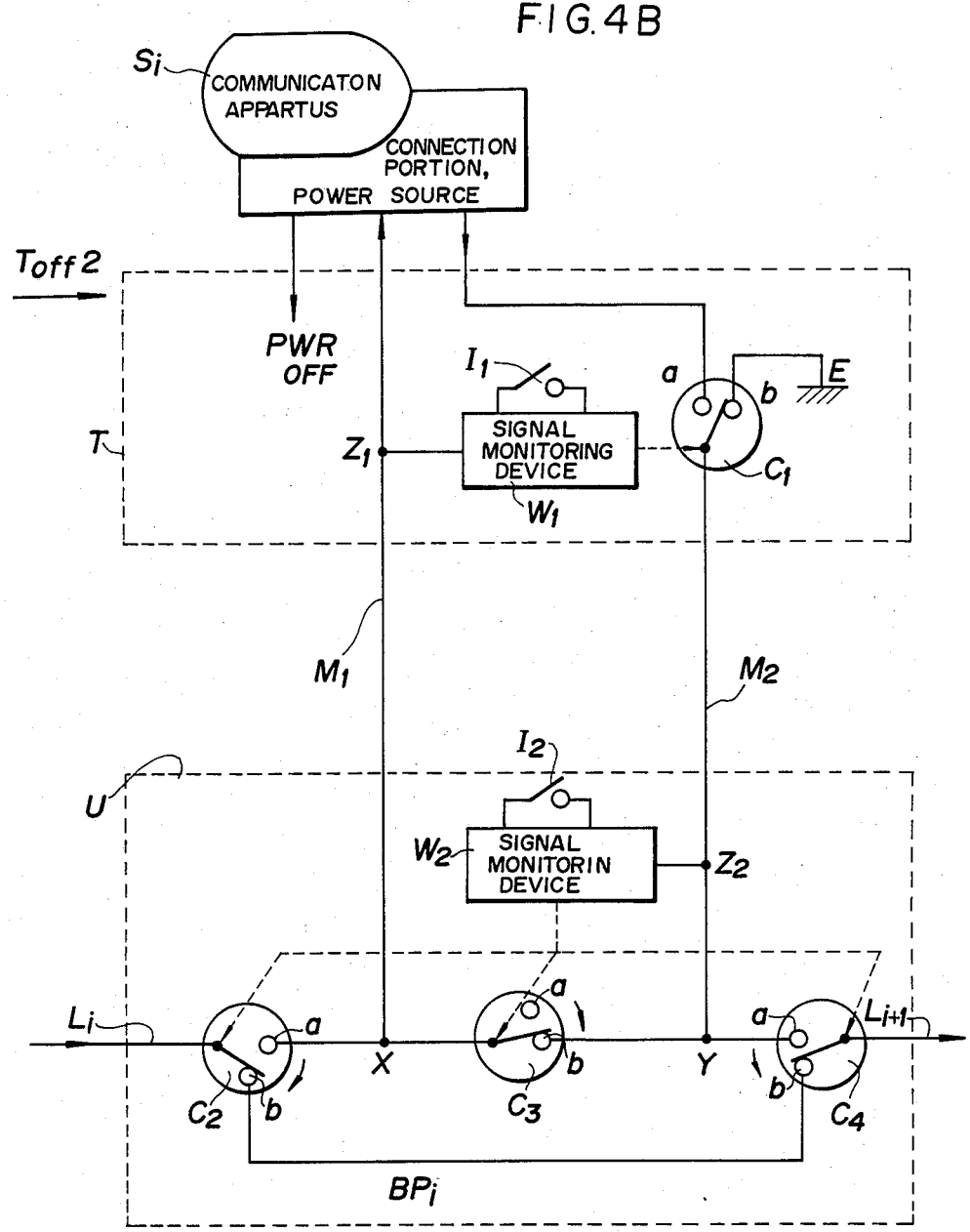

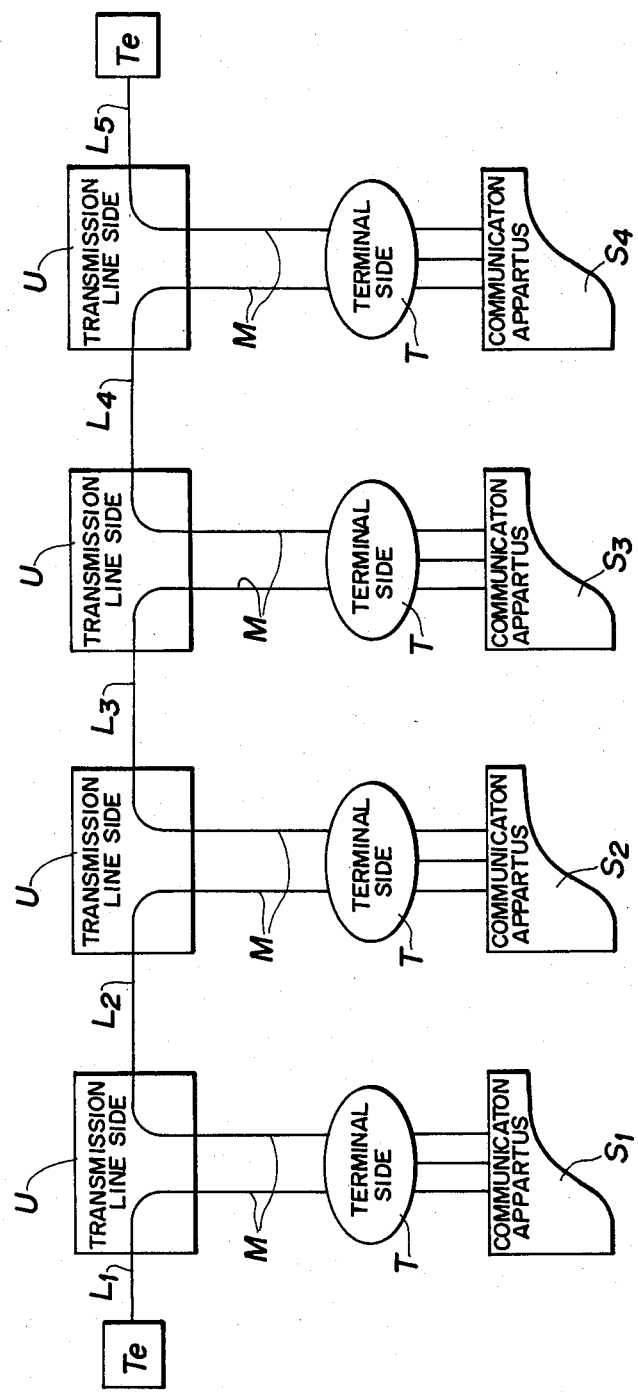
F I G. 12

TRANSMISSION LINE CONTROL SYSTEM WITH BY-PASS CONTROL

BACKGROUND OF THE INVENTION

1. Field of the Art:

The present invention relates generally to a ring-or loop-type or a unidimensional or linear signal transmission system and, more particularly, to a transmission line control system capable of disconnecting a terminal communication apparatus from or reconnecting it to a main transmission line reliably and speedily in such occasions as fault, release, turning on or off of the power source.

2. Prior Art:

Ring- or Loop-Type Transmission Line Control

FIG. 1 is a schematic circuit diagram illustrative of a ring- or loop-type transmission line control, in which terminal transmission apparatuses $S_1$, $S_2$, $S_3$ and $S_4$ are connected in a ring-shaped configuration by transmission lines L. By-passes $BP_1$, $BP_2$, $BP_3$ and $BP_4$ are added to the transmission lines L in parallel to the communication apparatuses $S_1$, $S_2$, $S_3$ and $S_4$.

Any one of the communication apparatuses can transmit signal to and receive a signal from any of the other communication apparatuses through the ring arrangement of transmission lines L.

The difference between the ring-type and the loop-type will now be described.

The term "ring-type" as used herein is to be understood to mean a transmission control system in which all the communication apparatuses are on the same state with respect to communication control and are controlled independently without any particular apparatus which acts as the center in control.

The term "loop-type" as used herein is to be understood to mean a transmission control system in which a specified communication apparatus has the function of communication control to perform all the control operations as the main apparatus.

While there is a difference in the main control apparatus between the ring-type and the loop-type as mentioned above, they are equivalent to each other in the configuration of the transmission lines.

Since the communication apparatuses are connected in series, when a fault occurs in any of the comminication apparatuses or in a line leading thereto, it is necessary to disconnect the faulty communication apparatus and to close the by-pass switch, to thereby prevent the ring transmission lines from being interrupted.

In the arrangement of FIG. 1, if a line fault R occurs in the communication apparatus $S_1$, a by-pass $BP_1$ is closed. Then, the communication apparatuses $S_4$ and $S_2$ are connected with each other and the apparatus $S_1$ is disconnected from the ring (loop). If the power source of the communication apparatus $S_3$ is cut off (denoted by Q), a by-pass $BP_3$ is closed and the apparatus $S_3$ is also disconnected from the ring (loop).

In case of occurrence of such fault or disconnection of the power source, the transmission line must be switched in order to maintain the loop transmission and the switching was heretofore performed either by (a) switching the transmission lines manually, or by (b) applying a control signal separately from the transmission data to the transmission lines for control.

The method (a) in which the transmission lines were switched manually had disadvnatages such as low reliability and slow response.

The method (b) will be described below.

Control Data Overlapping System

FIG. 2 is a block diagram illustrating the conventional transmission line control system. While FIG. 2 shows only one communication apparatus branched from the transmission line L, it must be understood that all the communication apparatuses are of the same configuration.

A transmission line side circuit U is provided on the side of the transmission line L, and subsidiary transmission lines M are provided to connect between the transmission line side circuit U and a terminal side circuit T.

The terminal side circuit T equivalent to the communication apparatus of FIG. 1 generates a data signal DS and a control signal CS, and overlaps and applies these signals as one signal to the subsidiary transmission line M. The transmission line side circuit U receives the overlapped signal and separates it into the data signal DS and the control signal CS. The transmission line and the terminal side are coupled to or separated from each other by the control signal CS.

Transmission of the signal from the transmission line side circuit U to the terminal side circuit T is performed in the same manner. That is, the data signal DS and the control signal CS are overlapped in the transmission line side circuit U and applied through the subsidiary transmission line M to the terminal side circuit T where they are separated back to the data signal DS and the control signal CS.

The data signal DS containing a large number of data comprises rapidly repeated pulses. The control signal CS changing in value only in case of some fault, failure in power source or other trouble is repeated very slowly and irregularly.

The conventional transmission line control system described above had the following disadvantages:

(a) Circuit was complicated—because an additional circuit was necessary for generating, overlapping and separating the signals; and (b) Reliability was low—because an additional control signal besides the data signal to be transmitted had to be sent through the transmission lines.

Accordingly, an object of the present invention is to provide a transmission line control system capable of switching the transmission lines reliably, quickly and automatically using only a data signal without using a control signal.

Another object of the present invention is to provide a transmission line control system in which, in the case where the power source is disconnected in a terminal apparatus, transmission is performed in the steady state among the remaining terminal apparatuses with said one apparatus excluded.

Still another object of the present invention is to provide a transmission line control system in which, in the case where the once disconnected power source of said terminal apparatus is connected again, said terminal apparatus is restored to the steady state when it is in order, or said terminal apparatus is not connected back to the main transmission lines when it is out of order.

Yet another object of the present invention is to provide a transmission line control system in which, in the case where a subsidiary transmission line fails, the terminal apparatus related to the fault is disconnected from the main transmission line so as to maintain the other terminal apparatuses in normal operation.

A further object of the present invention is to provide a transmission line control system in which a repaired terminal apparatus is reconnected to the steady state by manually closing an initially set switch.

SUMMARY OF THE INVENTION

To accomplish these objects of the present invention, a control mechanism to be described below is provided for each terminal communication apparatus connected with the main transmission lines. The terminal communication apparatus is connected with the main transmission line by an input side subsidiary transmission line to provide the data signal passing through the main transmission line to the terminal communication apparatus, and the terminal communication apparatus is connected with the main transmission line by an output side subsidiary transmission line to provide the data signal from the terminal communication apparatus to the main transmission line. The output side subsidiary transmission line is provided with a first change-over switch for alternatively connecting the output of the terminal apparatus or the earth. A first signal monitoring device monitors the data signal in the input side subsidiary transmission line and controls the first change-over switch to connect the terminal communication apparatus with the output side subsidiary transmission line when the data signal is received continuously for a length of time T on 1, or for a length of time T hold 1 after the power source of the terminal apparatus for supplying power to the terminal apparatus is turned on, or for the length of time T hold 1 after a first initially set switch provided in the first signal monitoring device is closed. When the data signal is interrupted for a length of time T off 1 continuously, the first signal monitoring device controls the first change-over switch to connect the output side subsidiary transmission line with the earth.

A second change-over switch is provided in the input side section of said main transmission line, a third change-over switch is provided in the main transmission line section between the subsidiary transmission lines on the input side and on the output side, respectively, and a fourth change-over switch is provided in the output side section of said main transmission line. Further, a by-pass is provided to interconnect the input side and the output side section of the main transmission line by the second and the fourth change-over switches. A second signal monitoring device monitors the data signal in the output side transmission line and controls the second, the third and the fourth change-over switches to connect the input side section of the main transmission line with the input side subsidiary transmission line with the output side subsidiary transmission line with the output side section of the main transmission line, respectively, and to disconnect the input side subsidiary transmission line from the output side subsidiary transmission line when the data signal is received continuously for a length of time T on 2, or for a length of time T hold 2 after a second initially set switch provided in this signal monitoring device is closed. When the data signal is not received for a length of time T off 2 continuously, the second signal monitoring device controls the second, the third and the fourth change-over switches to connect the input side section and the output side section of the main transmission line with the by-pass and to connect the input side and the output side subsidiary transmission lines with each other.

If the largest length of time of continuous absence of the data signal in the system under normal condition is taken as Tw, the constants deciding the periods of operation of the first and the second signal monitoring devices are determined to satisfy the following inequalities:

T on 2 > T hold 1 > T on 1,
T off 1 > T off 2 > Tw,
T off 1 > T on 1, and
T hold 2 > T on 1 + T on 2.

BRIEF DESCRIPTION OF THE DRAWINGS

The present invention will be better understood from the following description taken in connection with the accompanying drawings in which:

FIG. 4A is a schematic circuit diagram illustrative of the operation of the control system immediately after the power source of a terminal apparatus was disconnected;

FIG. 4B is a schematic circuit diagram illustrative of the state of the control system upon completion of by-pass after a length of time T off 2 when the power source of the terminal apparatus was disconnected;

FIG. 5A is a schematic circuit diagram illustrative of the state of the control system immediately after the power source of the terminal apparatus was turned on;

FIG. 6A shows the state immediately after the fault occurred, FIG. 6B shows the transient state after the length of time T off 1 has passed, and FIG. 6C shows the state further after the length of time T off 2 has passed;

FIG. 7A shows the state immediately after the fault occurred, FIG. 7B shows the transient state after the length of time T off 2 has passed, and FIG. 7C shows the state further after the length of time T off 1 has passed;

FIG. 8A shows the state immediately after an initially set switch $I_1$ is set and FIG. 8B shows the steady state after the length of time T on 2 has passed;

FIG. 9A shows the state immediately after an initially set switch $I_2$ is set, and FIG. 9B shows the state after the length of time T on 1 has passed;

FIG. 12 is a schematic circuit diagram of the transmission control system in which an embodiment of the present invention is applied to a daisy chain type network.

DETAILED DESCRIPTION OF THE PREFERRED EMBODIMENTS

Figure 1:
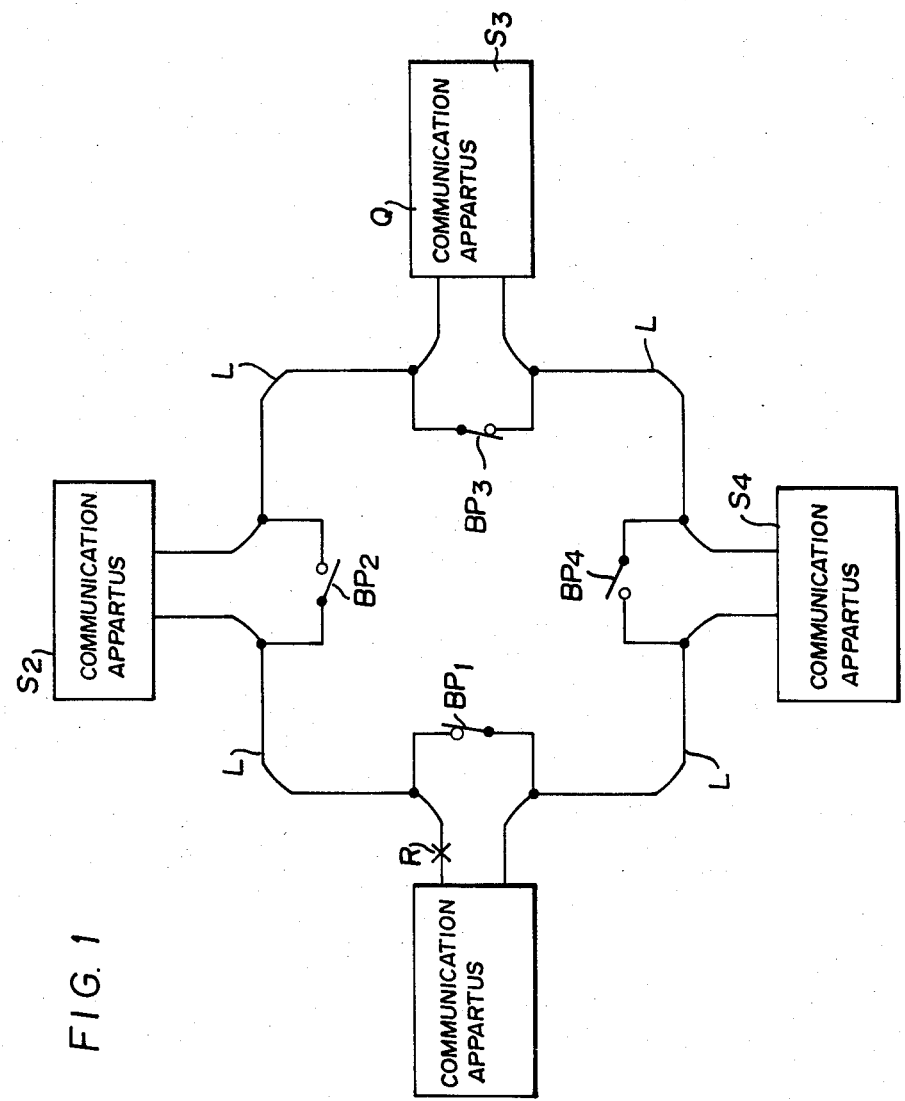
FIG. 1 is a schematic circuit diagram of a ring (loop) type transmission line, showing particularly the case where communication apparatuses $S_1$ and $S_3$ are by-passed because a line fault R and a disconnection Q of power source occurred in them, respectively.
Figure 2:
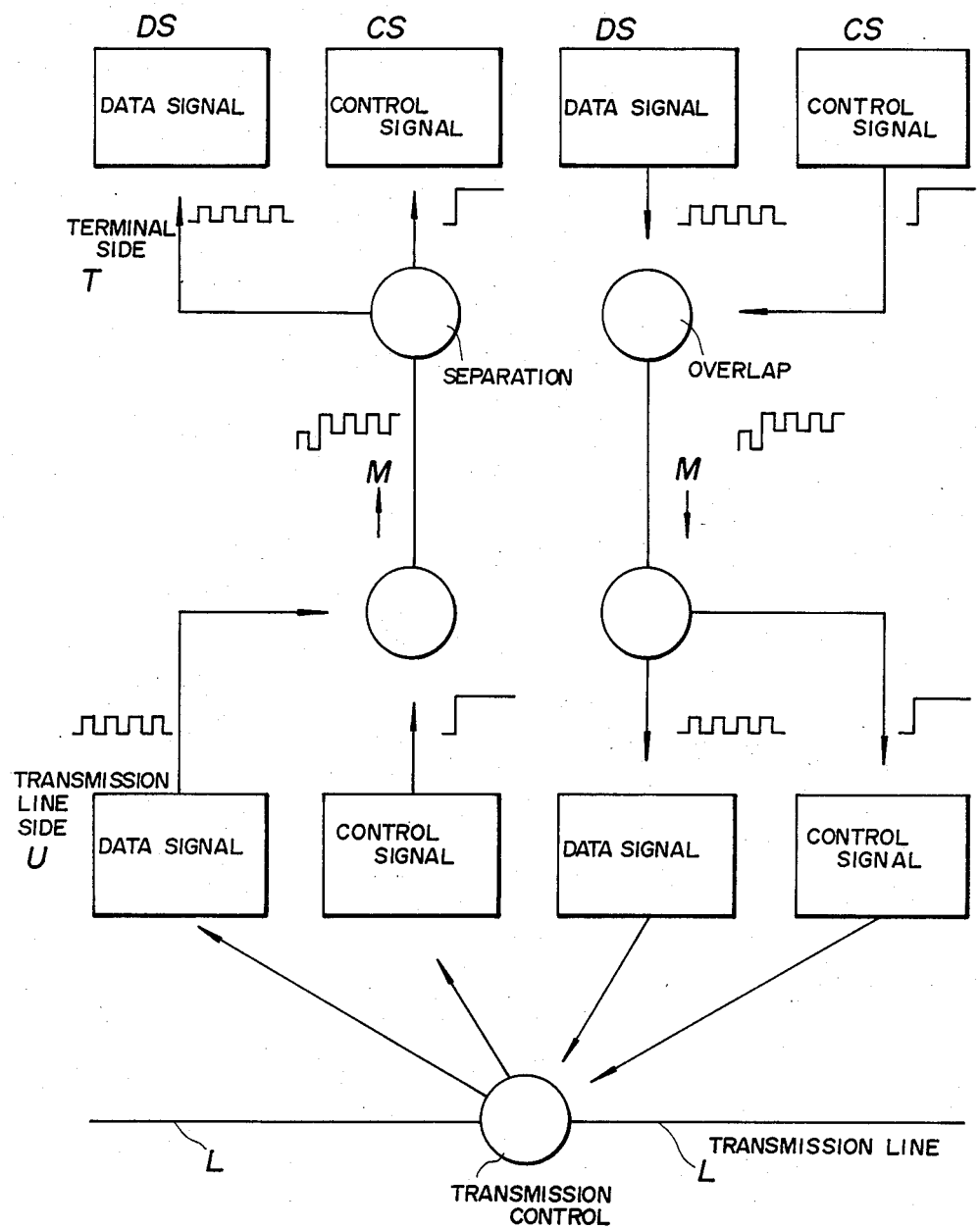
FIG. 2 (Prior Art) is a block diagram of a control data overlapping system according to a conventional transmission line control.
Figure 3:
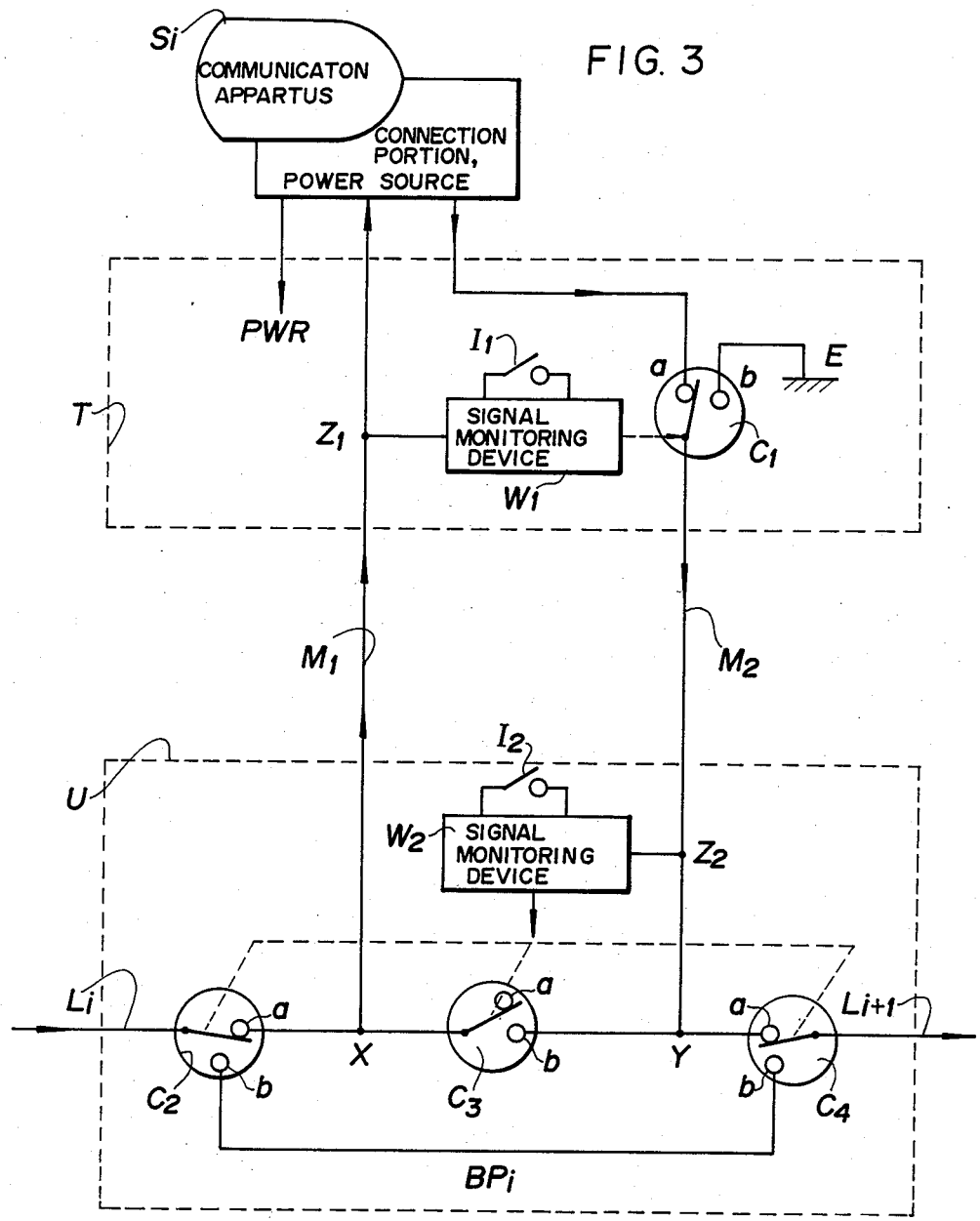
FIG. 3 is a control circuit diagram comprising main and subsidiary transmission lines, signal monitoring devices and a communication apparatus, for a terminal, for illustrating a transmission line control system according to the present invention.

A preferred embodiment of the present invention will now be described with reference to the drawings, in which FIG. 3 illustrates schematically the control circuit of the transmission control system according to the present invention. This circuit configuration is for one communication apparatus Si. Designated by the reference symbol Si is the ith communication apparatus and a number of equivalent communication apparatuses are provided in series to the apparatus Si. In FIG. 3, the portion including a portion of the communication apparatus Si and bounded by a solid line shows the power source and a connection portion of a signal line connecting the communication apparatus $S_i$ and the terminal T. The control system shown in FIG. 3 is provided for each of the communication apparatuses involved. Since these communication apparatuses involved are equivalent, only one control system will be described in detail below.

(a) Signal monitoring devices $W_1$ and $W_2$ are provided on the terminal side and on the transmission side, respectively.

(b) The signal monitoring devices $W_1$ and $W_2$ function to raise the level of the output signal when the signal is received for a predetermined length of time or longer continuously and to lower the level of the output signal when the reception of signal stops for a predetermined length of time or longer continuously.

(c) The signal monitoring devices $W_1$ and $W_2$ function to continuously raise the level of the output signal for a predetermined length of time when the power source is turned on or when initially set switches $I_1$ and $I_2$ are switched on.

(d) The setting of the length of time in (b) and (c) above can be varied by the field.

(e) On the terminal side there are provided the signal monitoring device $W_1$ and a change-over switch $C_1$ controlled thereby. The change-over switch $C_1$ is provided in a subsidiary transmission line $M_2$ directed from the terminal to the transmission side and functions to connect the subsidiary transmission line $M_2$ alternatively with the communication apparatus Si or the earth E.

(f) On the transmission side there are provided the signal monitoring device $W_2$ and change-over switches $C_2$, $C_3$ and $C_4$ disposed in a main transmission line L and controlled simultaneously by the signal monitoring device $W_2$. The two subsidiary transmission lines $M_1$ and $M_2$ are connected with the main transmission lines at two different junctions X and Y thereof, and the change-over switch $C_3$ is disposed intermediate between the two junctions. A portion of the main transmission line L connecting between the (i−1)th communication apparatus and the ith communication apparatus is to be referred to as a main transmission line section $L_i$. The change-over switch $C_2$ is disposed in the main transmission line section $L_i$ in the neighborhood of the junction X between the main transmission line section $L_i$ and the subsidiary transmission line $M_1$. The change-over switch $C_4$ is disposed in a main transmission line section $L_{i+1}$ in the neighborhood of the junction Y between the main transmission line section $L_{i+1}$ and the subsidiary transmission line $M_2$. The change-over switches $C_2$, $C_3$ and $C_4$ may be either of the type mechanically linked or of the type individually separated provided that these three change-over switches $C_2$, $C_3$ and $C_4$ are changed simultaneously. The change-over switches $C_2$, $C_3$ and $C_4$ are such, for example, as relays. They may be formed of semiconductor devices so as to have the equivalent function as relays. That is, each of the change-over switches changes the connection between the transmission lines by bringing a movable contact point into contact with two fixed contact points alternately.

As shown in FIG. 3, each of the change-over switches $C_2$, $C_3$ and $C_4$ has an upper contact point a and a lower contact point b.

The change-over switches $C_2$, $C_3$ and $C_4$ are changed simultaneously either to the contact points a or to the contact points b. Only these two states are allowed for these three change-over switches which are linked with each other electrically or mechanically and changed either to the contact points a or to the contact points b simultaneously.

When the change-over switches $C_2$, $C_3$ and $C_4$ are connected with the contact points a, the main transmission line sections $L_i$ and $L_{i+1}$ are connected with the subsidiary transmission lines $M_1$ and $M_2$, respectively. That is, the communication apparatus is inserted in the main transmission line L. This is the normal transmission state.

When the movable contact points of the change-over switches $C_2$, $C_3$ and $C_4$ are in contact with the contact points b, the communication apparatus Si is disconnected from the main transmission line L. However, the main transmission line L is not cut off but its sections $L_i$ and $L_{i+1}$ are connected with each other by a by-pass BPi.

(g) When output signals are given by each of the signal monitoring devices $W_1$ and $W_2$, the change-over switches $C_1$ to $C_4$ are in the states shown in FIG. 3, respectively.

When the output signal is not given or when the power source is cut off, the change-over switches $C_1$ to $C_4$ are in the states reverse to those shown in FIG. 3, respectively, as will be described individually below.

When the output signal of the signal monitoring device $W_1$ is given, the movable contact point of the chang-eover switch $C_1$ is in contact with the contact point a. Therefore, the communication apparatus Si is connected with the subsidiary transmission line $M_2$.

When the output signal is not given by the signal monitoring device $W_1$ or when the power source is cut off, the subsidiary transmission line $M_2$ is connected with the earth E.

The output signal of the signal monitoring device $W_2$ is given, the change-over switches $C_2$, $C_3$ and $C_4$ are changed to the contact points a, to thereby connect the main transmission line L with the subsidiary transmission lines $M_1$ and $M_2$.

When the output signal of the signal monitoring device $W_2$ is not given, the change-over switches $C_2$, $C_3$ and $C_4$ are changed to the contact points b, to thereby disconnect the subsidiary transmission lines $M_1$ and $M_2$ and the communication apparatus Si from the main transmission line L. On the other hand, the main transmission line sections $L_i$ and $L_{i+1}$ are connected with each other by the by-pass BPi.

(h) The power for the signal monitoring device $W_1$ and the change-over switch $C_1$ in the terminal side control circuit T is supplied from the terminal.

(i) The lengths of time included in the steps (b) and (c) above are determined as follows:

$$\text{T hold 2} > \text{T on 2} > \text{T hold 1} > \text{T on 1} \tag{1}$$

$$\text{T off 1} > \text{T off 2} > \text{Tw} \tag{2}$$

where Tw denotes the largest length of time of continuous absence of signal occurred in the system.

$$\text{T off 1} > \text{T on 1} \tag{3}$$

$$\text{T hold 2} > \text{T on 1} + \text{T on 2} \tag{4}$$

The conditions defined by the inequalities (3) and (4) are necessary only for achieving the restoration from the transmission side to the initial state of the change-over switches.

The time parameters T on 1, T off 1, T hold 1, T on 2, T off 2, and T hold 2 have the following meaning, that is the numerals 1 and 2 suffixed to the parameters correspond to the signal monitoring devices $W_1$ and $W_2$, respectively.

Parameters T on 1 and T on 2 denote the lengths of time of continuous presence of signal required to raise the level of the output signals of the signal monitoring devices $W_1$ and $W_2$, respectively. That is, when the level of the output signals of the signal monitoring devices $W_1$ and $W_2$ is low, the level is raised if the signals are provided to the signal monitoring devices $W_1$ and $W_2$ for the length of time T on continuously.

Parameters T off 1 and T off 2 denote the length of time of continuous absence of signal required to lower the level of the output signals of the signal monitoring devices $W_1$ and $W_2$, respectively. That is, if signals cease to be provided to the signal monitoring devices $W_1$ and $W_2$ when the level of the output signals of the signal monitoring devices $W_1$ and $W_2$ is high, the level of the output signals of the signal monitoring devices $W_1$ and $W_2$ is lowered if the absence of input signal in the signal monitoring devices $W_1$ and $W_2$ continues for the length of time T off.

The parameters T hold 1 and T hold 2 denote the lengths of time of holding of output signal when the power source or the initially set switch is turned on. The signal monitoring devices $W_1$ and $W_2$ have the initially set switches $I_1$ and $I_2$, respectively, which are normally opened. However, when a fault is repaired the initially set switches $I_1$ and $I_2$ are closed manually to restore the transmission lines to the normal condition.

When the initially set switches $I_1$ and $I_2$ are closed, the signal monitoring devices $W_1$ and $W_2$ raise the level of the output signals. Also, when the power source is turned on, the signal monitoring devices $W_1$ and $W_2$ raise the level of the output signals. This means that even when no input signal is received by the signal monitoring devices $W_1$ and $W_2$ after the level of the output signals is raised, the level of the output signals is maintained high for the length of time T hold.

The operation of the transmission line control system according to the present invention will now be described.

Operation I—Steady State

In the steady state, the ring transmission system operates in a normal state.

The signal monitoring device $W_1$ continuously receives signals from the main transmission line section $L_i$. In the same manner, the signal monitoring device $W_2$ continuously receives signals from the subsidiary transmission line $M_2$. If the ring (or the loop) is in a perfect continuity, the signal monitoring devices $W_1$ and $W_2$ receive the same signal.

The received signal becomes the sum of the signals originated from all the communication apparatuses $S_1$, $S_2$, ..., which are normally received without interruption.

Under certain circumstances, the reception of signal may be interrupted. However, there is the upper limit Tw in the length of time of continuous absence of signal determined by the construction of the system.

The inequality (2) imposes the condition that each of the time parameters T off 1 and T off 2 is larger than the upper limit Tw.

In the steady state, even when the data signals DS become fewer and the reception of signal stops, each of the lengths of time T off 1 and T off 2 is larger than the upper limit Tw. Accordingly, the signal monitoring devices $W_1$ and $W_2$ maintain the output signals continuously at "H" level without lowering it and the change-over switches $C_1$ to $C_4$ remain changed to the contact points a as shown in FIG. 3.

The data signal DS passing in the main transmission line section $L_i$ is conveyed to the terminal communication apparatus Si through the subsidiary transmission line $M_1$. The signal of the terminal communication apparatus Si is transmitted to the main transmission line section $L_{i+1}$ through the subsidiary transmission line $M_2$.

Operation II—In the case of disconnection of power source in the terminal

Description will be made with reference to the case where the power source in the terminal is cut off for some reason.

The power source in the terminal supplies the electric power to the communication apparatus Si and the terminal side control circuit T. When this power source is cut off, the communication apparatus Si on the terminal side ceases to provide the data signal and the reception function also stops. Further, the change-over switch $C_1$ becomes also inoperable and is changed to the contact point b, to thereby connect the subsidiary transmission line $M_2$ with the earth E. This state is shown in FIG. 4A.

Since the power source of the transmission side control circuit U is independent from that of the terminal side control circuit T, the signal monitoring device $W_2$ continues operation. Since the subsidiary transmission line $M_2$ is earthed, the data signal is not received by the signal monitoring device $W_2$. Upon detection of the continuous absence of the signal for the length of time T off 2, the signal monitoring device $W_2$ changes the change-over switches $C_2$, $C_3$ and $C_4$ to the contact points b. This state is shown in FIG. 4B.

Therefore, the terminal communication apparatus Si is disconnected from the main transmission line L. Since the main transmission line sections $L_i$ and $L_{i+1}$ are connected with each other by the by-pass BPi, the transmission-reception relationship among other communication apparatuses (except Si) is maintained.

The downstream ($S_{i+1}$) signal monitoring devices $W_1$ also do not receive the data signal from the moment the power source is cut off until the change-over switches $C_2$, $C_3$ and $C_4$ are changed to the contact points b. However, since there is the following relationship represented by the inequality (2), that is:

T off 1 > T off 2, the level of the output of the downstream side ($S_{i+1}$, $S_{i+2}$, ... ) signal monitoring devices $W_1$ remain high as in the steady state.

The signal monitoring devices $W_2$ on the downstream side ($S_{i+1}$, ... ) lowers the output level when signal is absent for the length of time T off 2. However, since the signal monitoring device $W_2$ may possibly receive the data signal DS from the downstream communication apparatus $S_{i+1}$, the length of time T off 2 is larger than the upper limit Tw for the length of time of the continuous absence of the data signal DS as represented by the inequality (2) as follows:

T off 2 > Tw.

Therefore, it is not possible that the absence of signal continues for the length of time T off 2. Accordingly, there is no change in the output level in the signal monitoring device $W_1$ on the downstream side, as in the steady state.

In the terminal communication apparatus Si in which the power source is turned off, the subsidiary transmission lines $M_1$ and $M_2$ are disconnected from the main transmission line L and are at the same time connected with each other by the change-over switch $C_3$ so that it can be used for test and control as will be described hereinbelow when the power source is turned on.

As described above, when the power source of the ith terminal is turned off, the ith change-over switches $C_1$ to $C_4$ are all changed to the contact points b, to thereby isolate the ith unit from the main transmission line maintaining the transmission-reception relationship among the other terminals as in the steady state.

Operation III—In the case of turning-on of the power source in a terminal

Description will now be made with respect to the operation in the case where the power source in the terminal is turned on following the state shown in FIG. 4B.

Figure 5A:
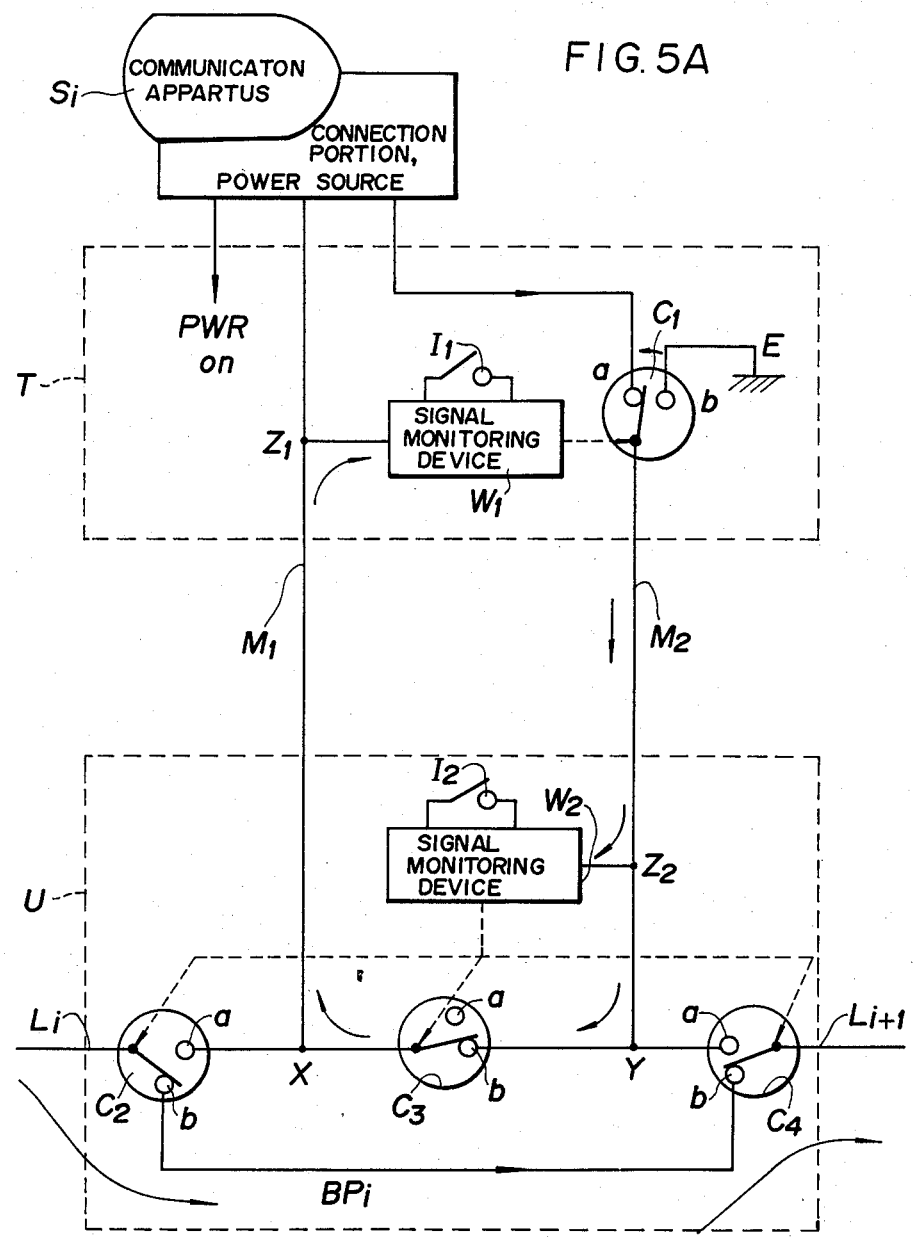

The signal monitoring device $W_1$ maintains the output at the level "H" for the length of time T hold 1 from the moment the power source is turned on, and the change-over switch $C_1$ is changed to the contact point b. The same result is obtained by closing the initially set switch $I_1$. FIG. 5A shows the state immediately after the turning-on of the power source.

When the power source is turned on, the terminal communication apparatus Si starts sending the data signal. If there is no particular abnormality, the data signal from the terminal communication apparatus Si passes through the change-over switch $C_1$ (the contact point a) and the changeover switch $C_3$ (the contact point b) and is looped back to the signal monitoring device $W_1$ from the subsidiary transmission line $M_1$ of the same terminal.

While said data signal DS is looped back, the other terminal apparatuses are not affected at all because the ith terminal apparatus Si is disconnected from the main transmission line L.

The signal monitoring device $W_1$ confirms that the signal comes in continuously for the length of time T on 1 or longer. Thereafter, the signal monitoring device $W_1$ is put in the steady state in which it maintains the output at the "H" level and keeps the change-over switch $C_1$ to the contact point a. This is made possible by the following relationship expressed by the inequality (1):

T hold 1 > T on 1.

If there is a disconnection in the path from the communication apparatus $S_1$ to the signal monitoring device $W_1$ through the subsidiary transmission line $M_2$, the changeover switch $C_3$ and the subsidiary transmission line $M_1$, no data signal is received by the signal monitoring device $W_1$ which is not restored to the steady state. However, the output of the signal monitoring device $W_1$ remains at the "H" level for the length of time T hold 1. After the signal monitoring device $W_1$ is restored to the steady state, the level of its output can remain at "H" for an indefinite time longer than the length of time T hold 1. Accordingly, it can be detected whether the path $M_2$-$C_3$-$M_1$ is normal or not by monitoring the output of the signal monitoring device $W_1$. Discrimination between normal and abnormal is made by the signal monitoring device $W_2$. For this purpose, the following relationship represented by the inequality (1) is required to be maintained:

T on 2 > T hold 1.

Figure 5B:
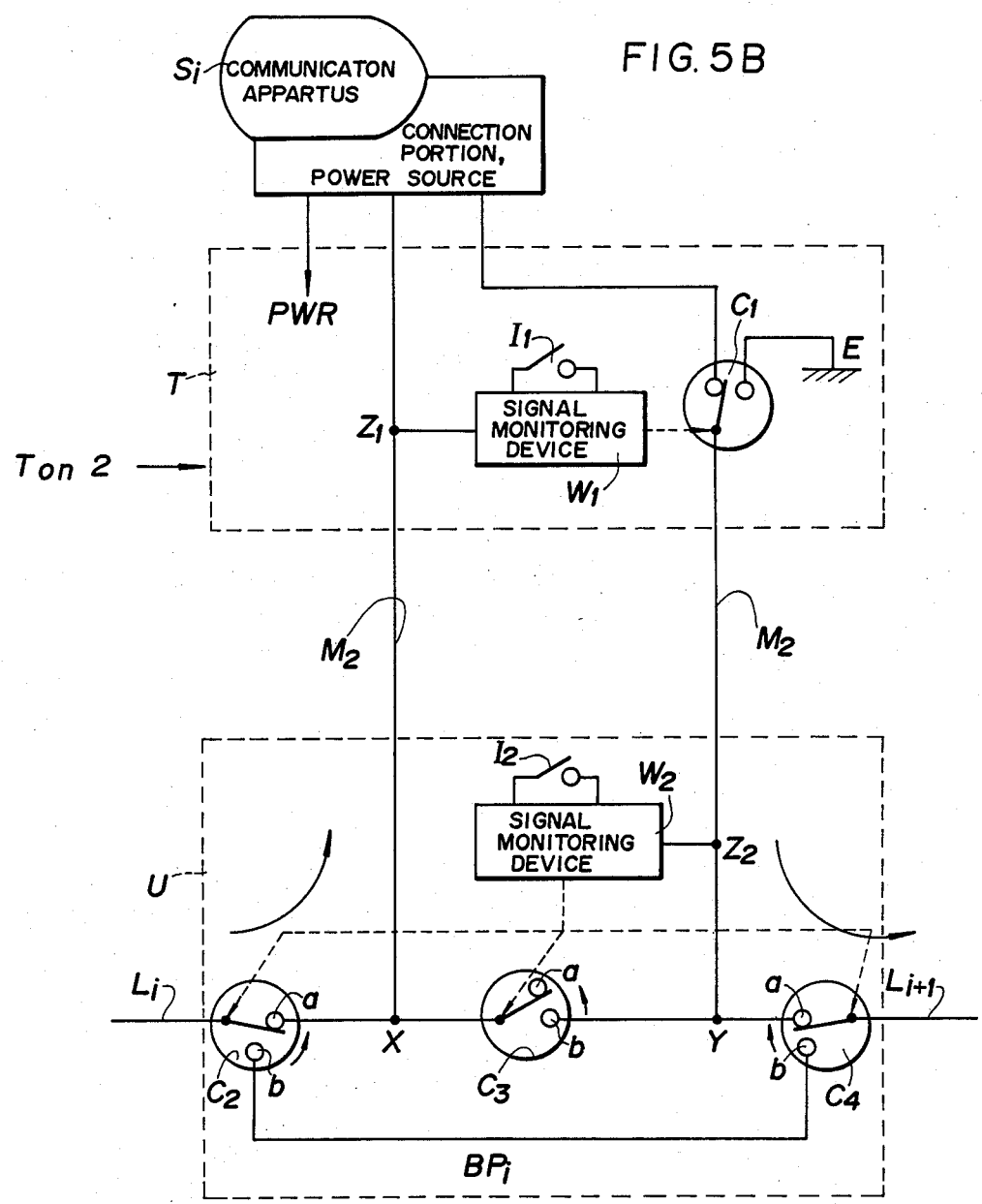
FIG. 5B is a schematic circuit diagram illustrative of the state of the control system restored to the steady state after the length of time T on 2 has elapsed from the turning-on of the power source of the terminal apparatus.

That is, if the path $M_2$-$C_3$-$M_1$ is normal, the signal monitoring device $W_1$ is restored to the steady state, and even after the length of time T hold 1 elapsed the output of the signal monitoring device $W_1$ remains at the "H" level and the change-over switch $C_1$ remains changed to the contact point a. For this reason, the signal monitoring device $W_2$ confirms that the date signal DS from the communication apparatus Si comes continuously for the length of time T on 2 or longer. Thereafter, the level of the signal monitoring device $W_2$ is raised and the change-over switches $C_1$ to $C_4$ are changed to the contact points a. FIG. 5B shows the steady state restored as described above. The terminal communication apparatus Si, and subsidiary transmission lines $M_1$ and $M_2$ are connected with the main transmission line L, whereby the operation for reconnecting this terminal to the main transmission line is completed.

If the path $M_2$-$C_3$-$M_1$ is not normal and no data signal DS comes in the signal monitoring device $W_1$, the monitoring device $W_1$ lowers its signal level after the length of time T hold 1, and the change-over switch $C_1$ connects the subsidiary transmission line $M_2$ with the earth E. Then, since the input of the data signal to the signal monitoring device $W_2$ is stopped within a length of time shorter than the length of time T on 2, the output of the signal monitoring device $W_2$ remains at the "L" level.

Accordingly, the change-over switches $C_2$, $C_3$ and $C_4$ remain changed to the contact points b. In the result, if there is some abnormality in the path $M_2$-$C_3$-$M_1$, even when the power source is turned on, the signal monitoring devices $W_1$ and $W_2$ are restored to the state shown in FIG. 4B after the length of time T hold 1 elapsed, during which the main transmission line L and the other terminals are not affected at all.

In this manner, the occuurence of some fault in the terminal can be detected by monitoring the state of the signal monitoring device $W_1$. In case of some fault or abnormality, this terminal is not reconnected with the main transmission line L.

Operation IV—The case of fault (1)

Disconnection in the subsidiary transmission lines $M_1$ and $M_2$ is a case of the fault.

Figure 6B:
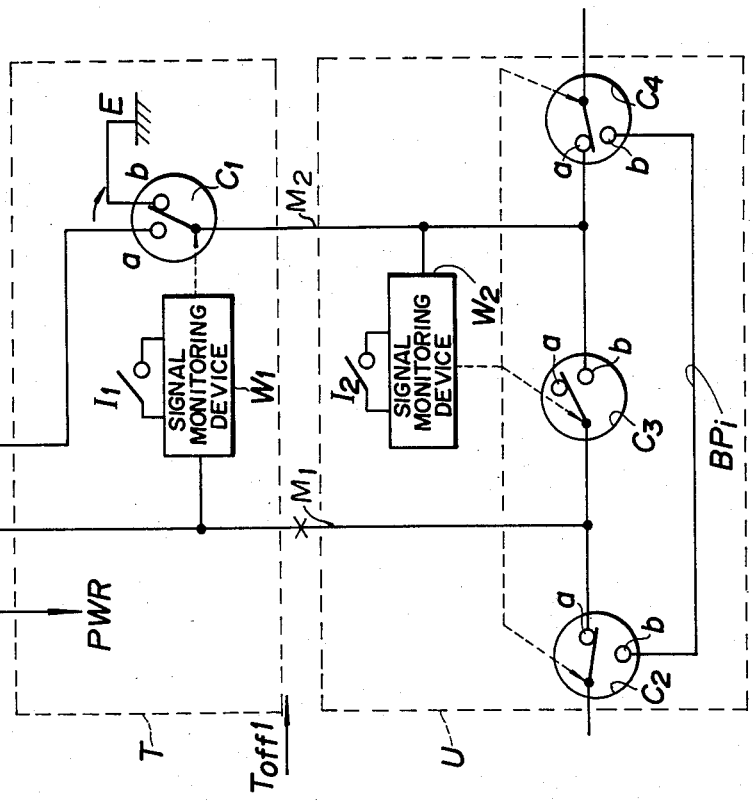
FIGS. 6A, 6B and 6C are schematic circuit diagrams illustrative of operations of the control system in the case where a fault occurred in the subsidiary transmission line $M_1$ upstream of the signal monitoring device $W_1$, in which, particularly.
Figure 6A:
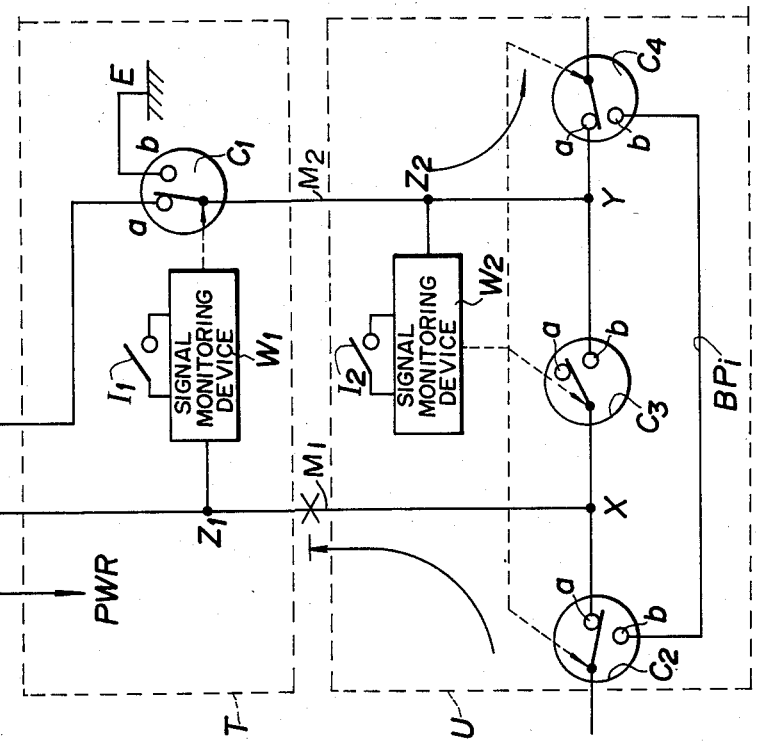

The operation in the case of disconnection in the subsidiary transmission line $M_1$ upstream of the signal monitoring device $W_1$ as shown in FIG. 6A will be described as the operation in the case of fault (1).

Incoming of the data signal from the main transmission line section $L_i$ is interrupted by the disconnection in the line. The signal monitoring device $W_1$ detects that the incoming of the signal is interrupted continuously for the length of time T off 1 and changes the change-over switch $C_1$ to the contact point b as shown in FIG. 6B to thereby connect the subsidiary transmission line $M_2$ to the earth E. Therefore, no signal is transmitted to the subsidiary transmission line $M_2$ and the line downstream thereof.

From the moment of disconnection of the line until the interruption of the signal, the signal monitoring devices on the side downstream thereof ($S_{i+1}$, ...) are not affected at all because the data signal DS is transmitted from the terminal communication apparatus Si to its signal monitoring device $W_2$ and to the signal monitoring devices $W_1$ and $W_2$ on the downstream side.

Figure 6C:
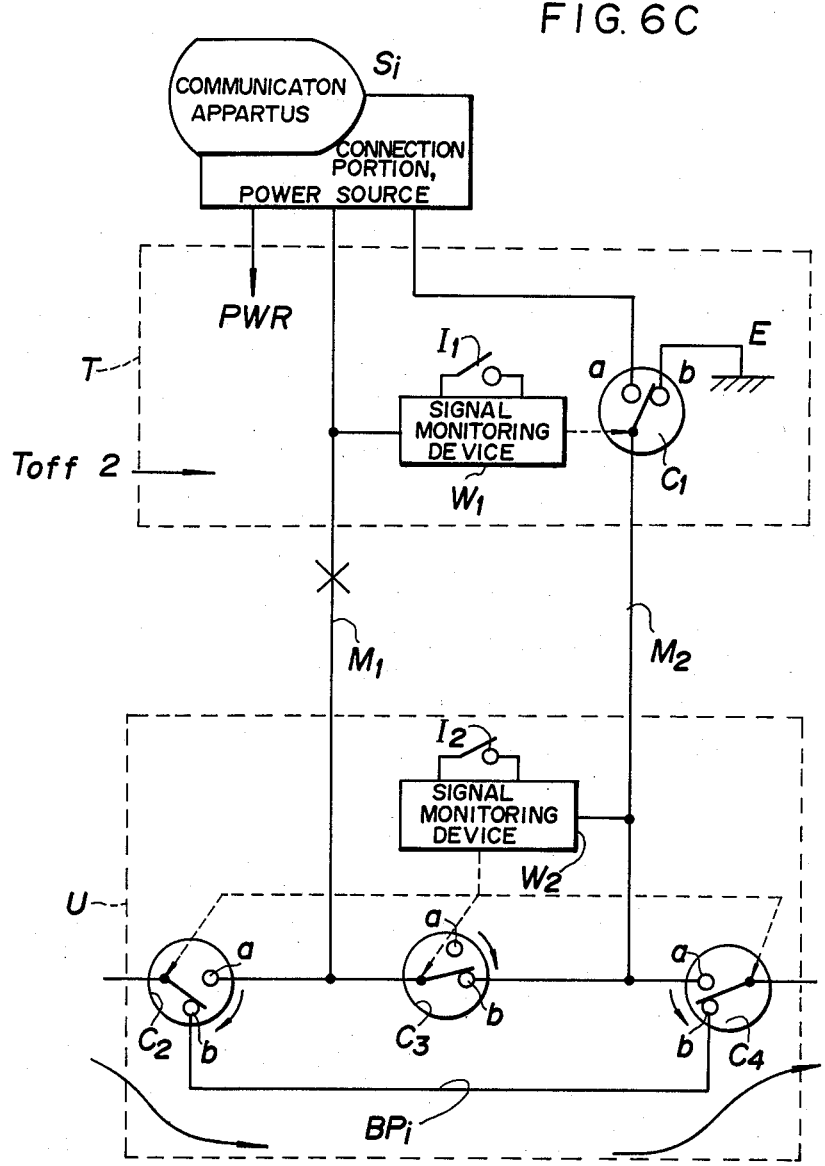

When the signal is interrupted in the subsidiary transmission line $M_2$ and in the line downstream thereof, no signal comes to the signal monitoring device $W_2$ which detects that the incoming of the signal is interrupted continuously for the length of time T off 2 and changes the change-over switches $C_2$, $C_3$ and $C_4$ to the contact points b to thereby set them to the by-pass mode as shown in FIG. 6C.

Since T off 2 < T off 1, the signal monitoring devices $W_1$ on the side downstream thereof ($S_{i+1}$, ...) are not affected at all.

In this manner, the terminal related to the fault occurred is disconnected from the main transmission line L which continues its normal operation.

Operation V—The case of fault (2)

Figure 7B:
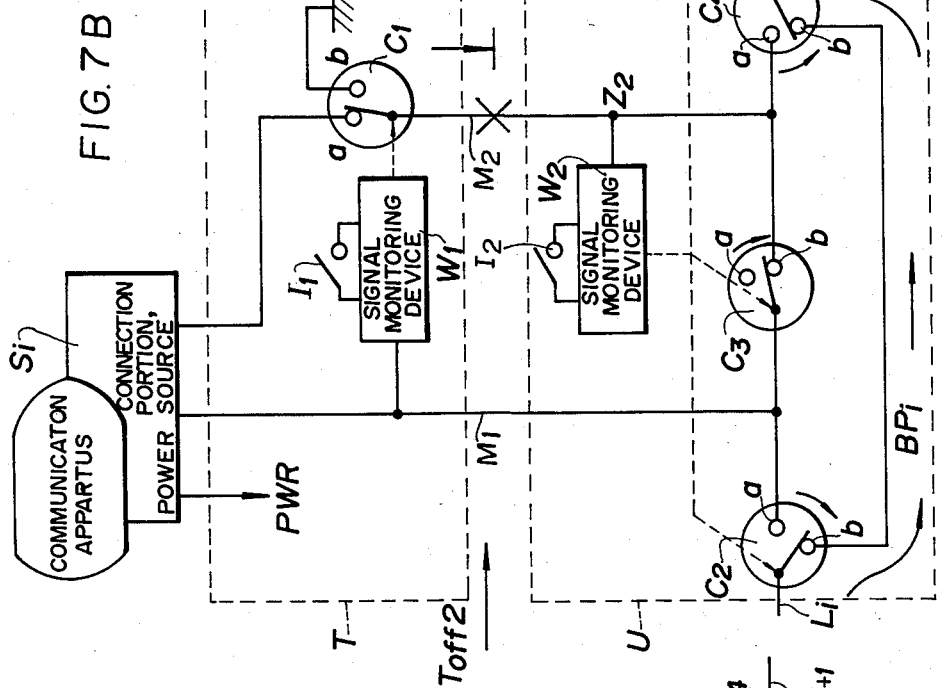
FIGS. 7A, 7B and 7C are schematic circuit diagrams illustrative of operations of the control system in the case where a fault occurred in the subsidiary transmission line $M_2$ upstream of the signal monitoring device $W_2$, in which, particularly.
Figure 7A:
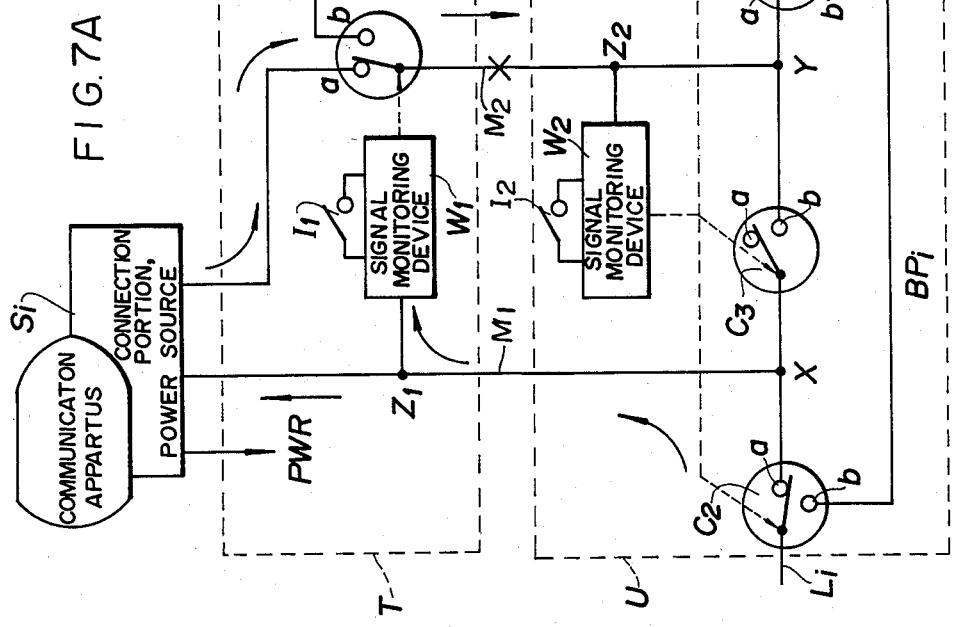

The case of disconnection in the subsidiary transmission line $M_2$ upstream of the signal monitoring device $W_2$ as shown in FIG. 7A will be taken up as the case of fault (2).

Incoming of the signal is interrupted by the disconnection in the line and no signal comes to the signal monitoring device $W_2$ of the terminal Si and the signal monitoring device $W_1$ of the next terminal $S_{i+1}$. Since T off 1 > T off 2, after the length of time T off 2, the signal monitoring device $W_2$ of the ith terminal changes the change-over switches $C_2$, $C_3$ and $C_4$ to the contact points b to set them to the by-pass mode as shown in FIG. 7B.

In this manner, the terminal related to the fault occurred is disconnected from the main transmission line L which continues its normal operation and enables it that the data signal DS comes to the signal monitoring device $W_1$ of the (i+1)th terminal.

Figure 7C:
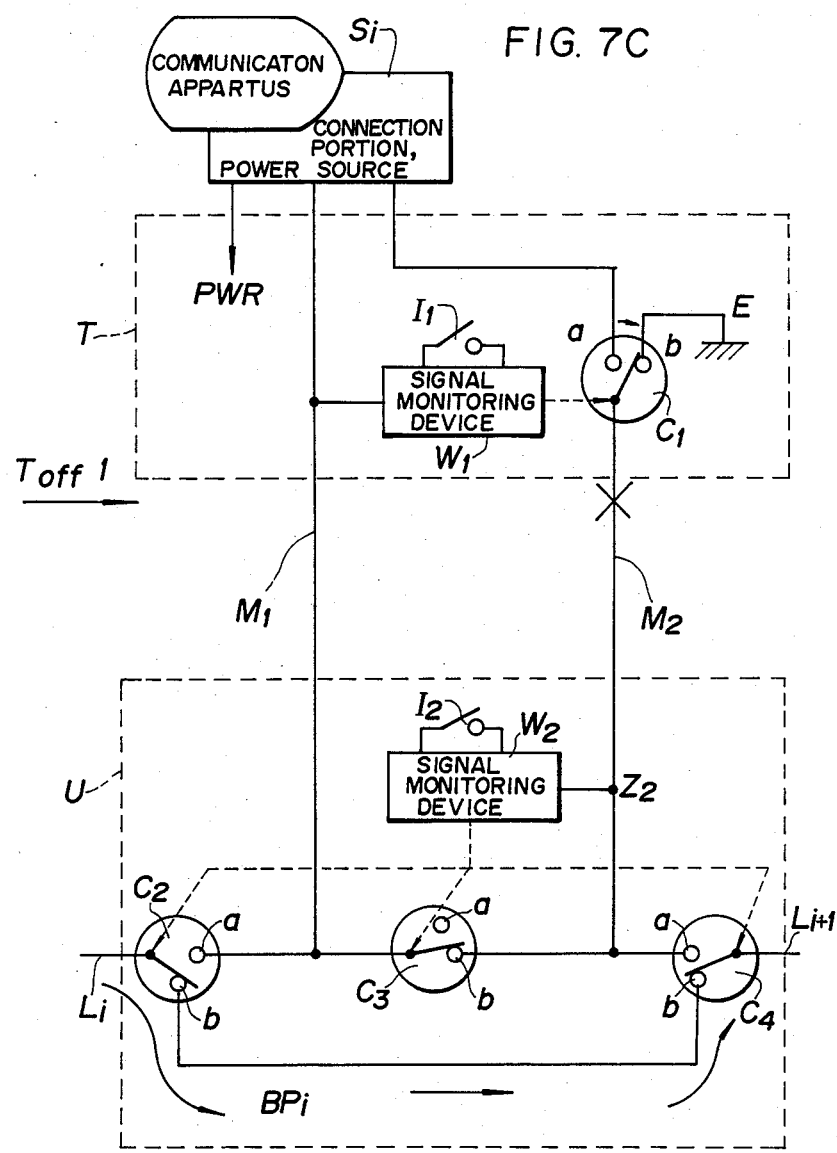

Further, in this terminal, incoming of the signal to the signal monitoring device $W_1$ is interrupted and the signal monitoring device $W_1$ detects that the signal is interrupted for the length of time T off 1 continuously and sets the change-over switch $C_1$ to the signal interruption mode (to the contact point b) as shown in FIG. 7C.

The case of fault (2) includes a disconnection in the subsidiary transmission line $M_2$ up to a point $Z_2$ ($Z_2$ denotes the junction between the input of the signal monitoring device $W_2$ and the subsidiary transmission line $M_2$) and a defect in the communication apparatus Si.

Operation VI—Correction of fault from the terminal side

The faults described in the cases (1) and (2) above are supposed to have been corrected by some method.

When the correction is finished, the operator closes by hand the initially set switch $I_1$ of the signal monitoring device $W_1$.

Figure 8A:
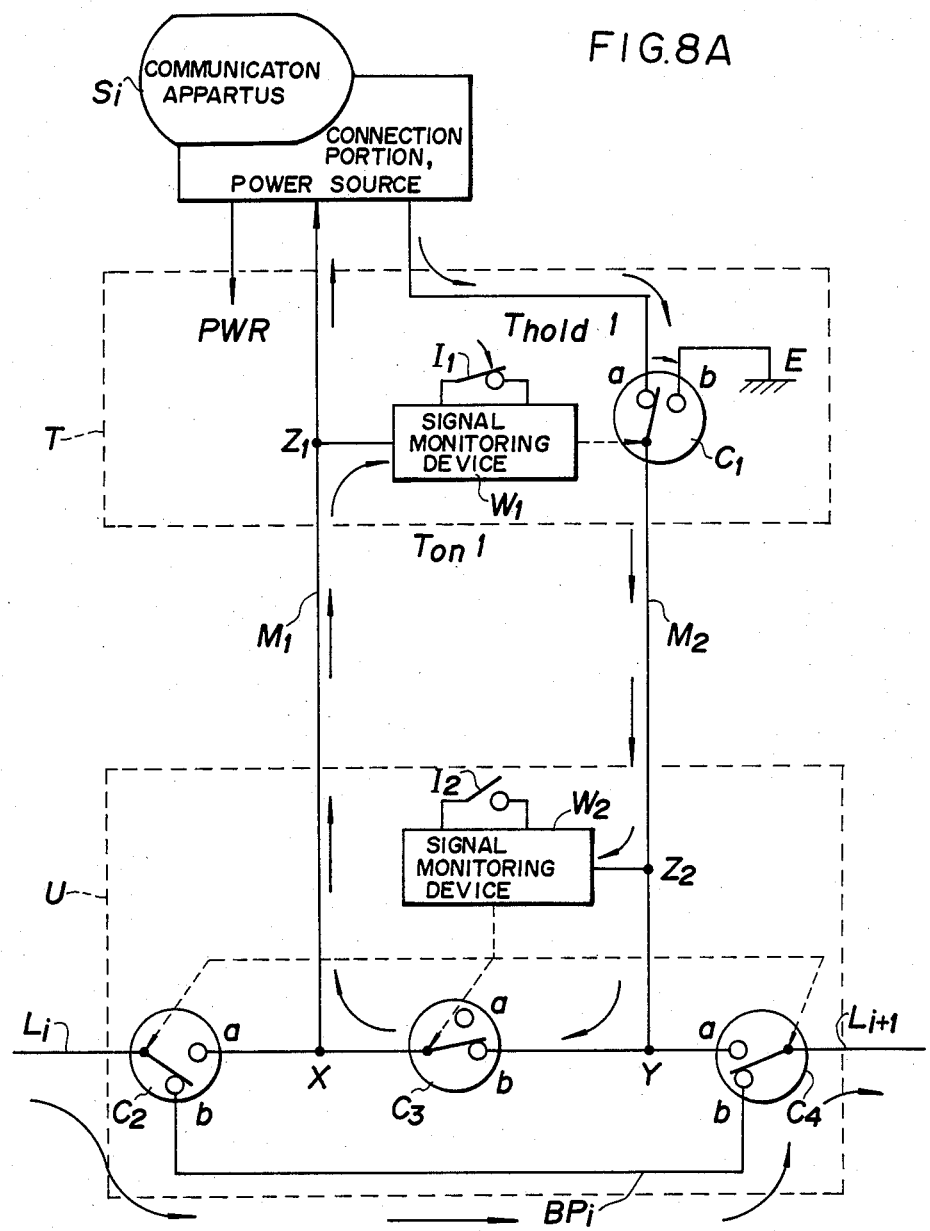
FIGS. 8A and 8B are schematic circuit diagram illustrative of the state of the control system, showing the process of recovery from the fault on the terminal side, in which, particularly.

The signal monitoring device $W_1$ raises the output to "H" level for the length of time T hold 1 and the movable contact point of the change-over switch $C_1$ is changed for contact with the contact point a. The signal of the communication apparatus Si passes through the change-over switch $C_1$, the subsidiary transmission line $M_2$, the change-over switch $C_3$ and the subsidiary transmission line $M_1$, and is received by the signal monitoring device $W_1$ as shown in FIG. 8A.

Since T hold 1 > T on 1, the signal monitoring device $W_1$ is brought into the steady state after the length of time T on 1 elapsed and maintains its output at the "H" level.

Figure 8B:
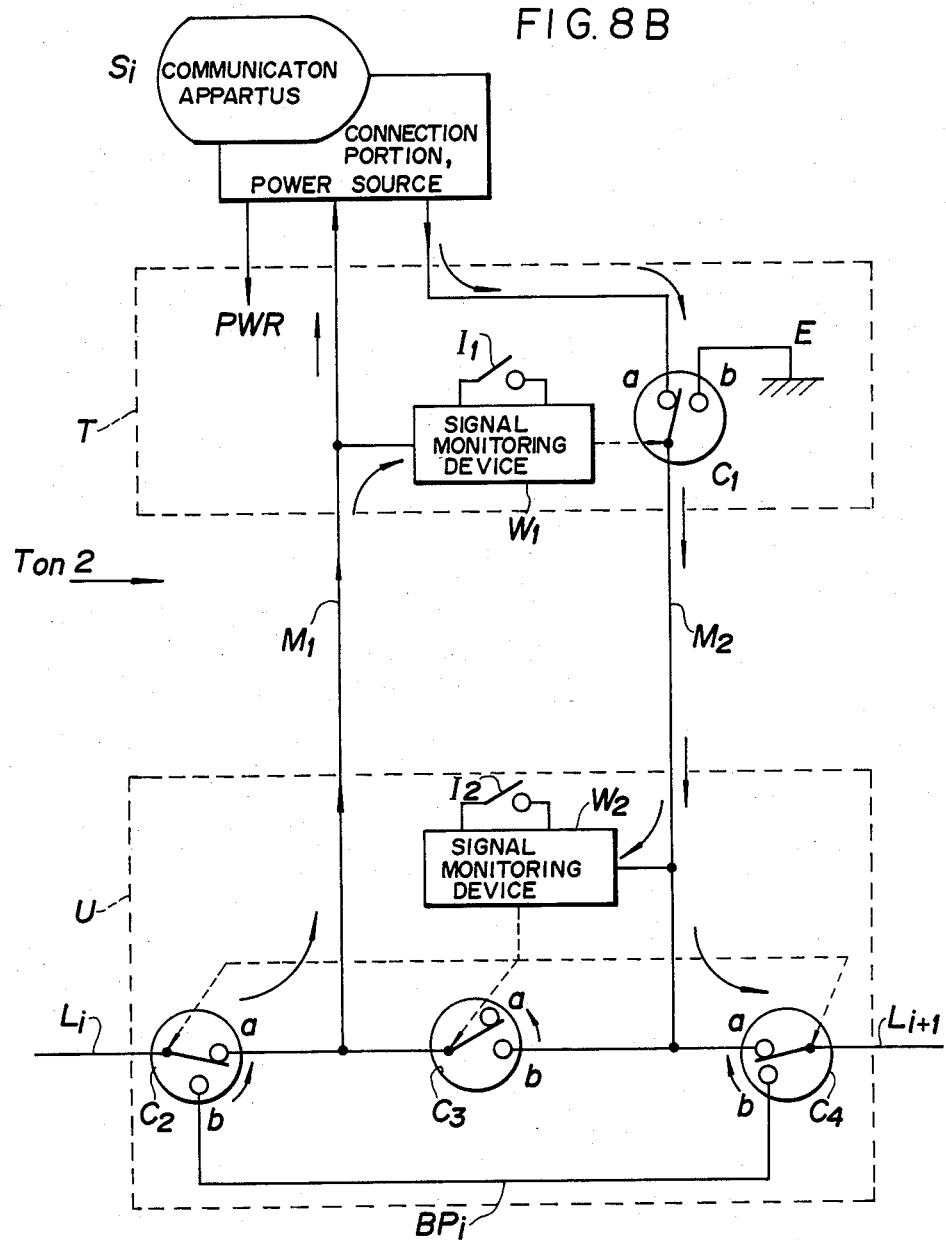

If there is no other abnormality, the signal monitoring device $W_2$ raises its output to the "H" level after the length of time T on 2 elapsed. The change-over switches $C_2$, $C_3$ and $C_4$ are changed from the contact points b to a, whereby this terminal is reconnected to the main transmission line L. The signal monitoring devices $W_1$ and $W_2$ are restored to the steady state as shown in FIG. 8B.

If there is any other abnormality, the output level of the signal monitoring device $W_1$ is at "H" for the length of time T hold 1, and even after this length of time the signal monitoring device $W_1$ is not restored to its original state. Then, since T on 2 > T hold 1, the state of the signal monitoring device $W_2$ is not changed and the change-over switches $C_2$, $C_3$ and $C_4$ remain in the by-pass mode. Accordingly, this terminal is not reconnected with the main transmission line, and this fact shows that the fault is remaining uncorrected.

Other faults which can be detected by this method are disconnections in the subsidiary transmission line $M_2$ and $M_1$ and defects in the communication apparatus Si. In the case where any of these other faults is present, if the terminal is reconnected to the main transmission line L, the transmission systems in other ring transmission lines cease to operate satisfactorily. The condition T on 2 > T hold 1 is introduced to prevent such double accidents.

If the initially set switch $I_1$ is turned on by an error, a secondary accident by such an error can be prevented because the terminal is not reconnected with the main transmission line until the fault in the terminal has been completely corrected.

Operation VII—Correction of fault from the main transmission line side

After the fault in the subsidiary transmission line or the communication apparatus of the terminal has been corrected, normal function can be restored by operating the transmission line side control circuit U. This operation is accomplished by turning on by hand the initially set switch $I_2$ of the signal monitoring device $W_2$.

Figure 9A:
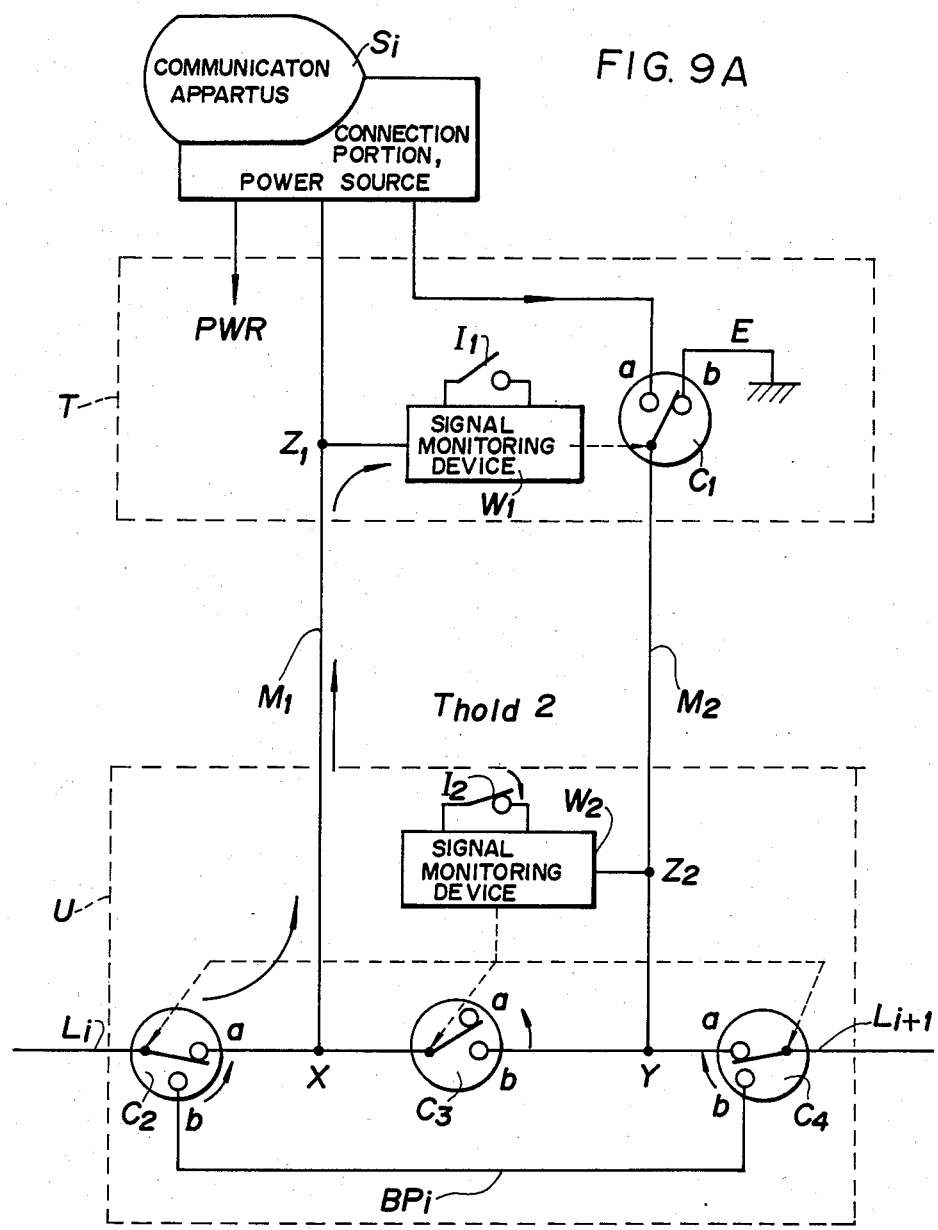
FIGS. 9A and 9B are schematic circuit diagram illustrative of the state of the control system, showing the process of recovery from the fault on the transmission side, in which, particularly.

When the initially set switch $I_2$ is closed, the signal monitoring device $W_2$ maintains its output at the "H" level for the length of time T hold 2 and the change-over switches $C_2$, $C_3$ and $C_4$ are changed from the contact points b (by-pass mode) to the contact points a as shown in FIG. 9A. The main transmission line sections $L_i$ and $L_{i+1}$ are connected with the subsidiary transmission lines $M_1$ and $M_2$, respectively.

Since T hold 2 > T on 1, the signal monitoring device $W_1$ detects continuous incoming of the data signal DS for the length of time T on 1 and raises the output level to "H".

Figure 9B:
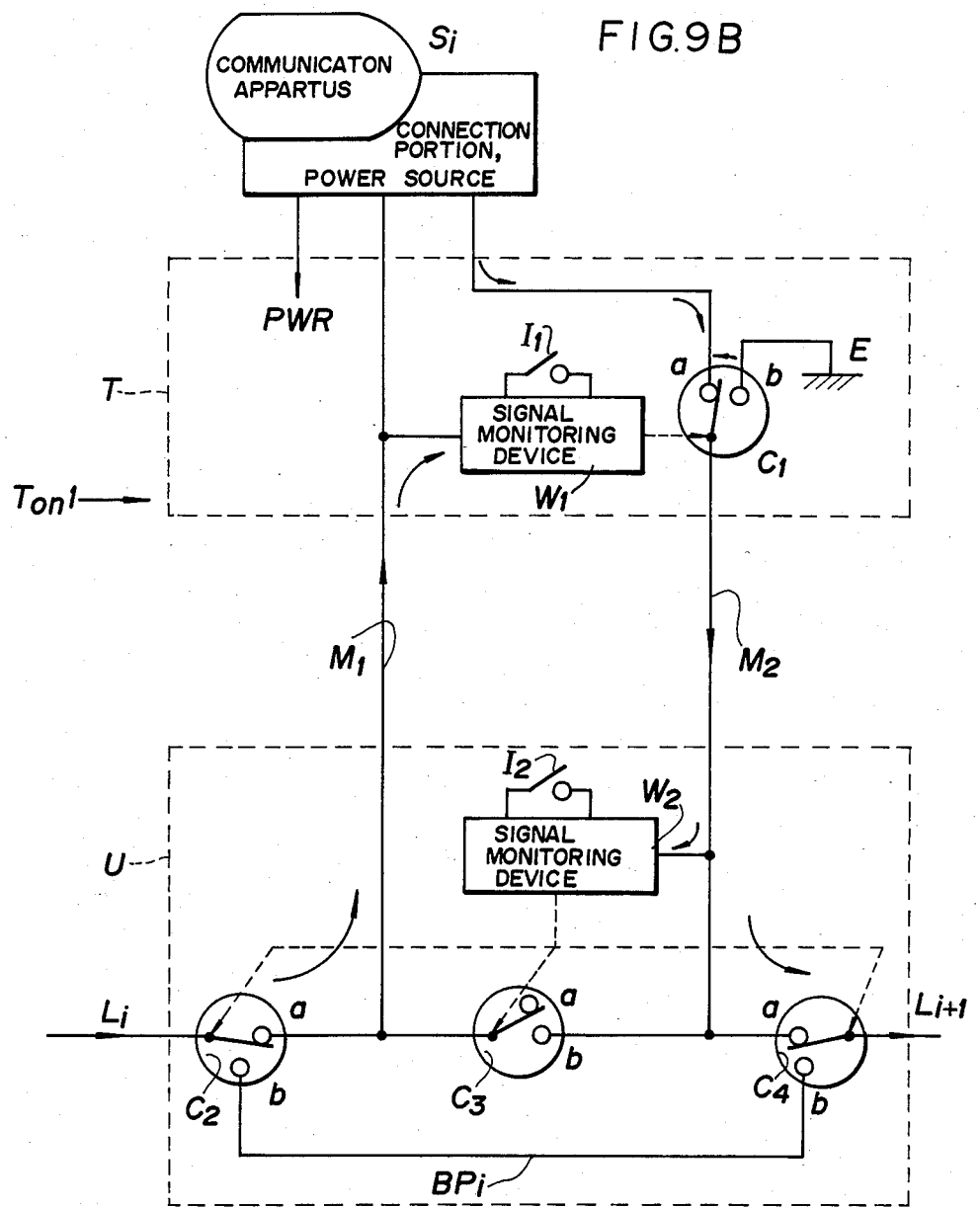

The change-over switch $C_1$ is changed from the contact point b to the contact point a as shown in FIG. 9B. The signal monitoring device $W_1$ has been restored to the steady state.

After the change-over switches $C_2$, $C_3$ and $C_4$ are changed to the contact points a until the change-over switch $C_1$ is changed to the contact point a, that is, for the length of time T on 1, the signal is interrupted in the downstream, however, the signal monitoring device $W_1$ in the downstream ($S_{i+1}$) is not affected at all because T off 1 > T on 1.

Since the change-over switch $C_1$ is changed to the contact point a, the data signal DS begins to come in the signal monitoring device $W_2$. After the signal monitoring device $W_2$ detects the signal continuously for the length of time T on 2, it is brought into the steady state.

Since the length of time T hold 2 is longer than (T on 1 + T on 2), this steady state is surely attained in normal operation.

In case of abnormality, the operation is as follows.

If there is a disconnection in the subsidiary transmission line $M_1$, the signal monitoring device $W_1$ is not restored to the steady state even when the initially set switch $I_2$ on the main transmission line side is closed. Accordingly, the subsidiary transmission line $M_2$ remains connected with the earth E. The signal monitoring device $W_2$ also is not restored to the steady state and lowers its output level after the length of time T hold 2, and the change-over switches $C_2$, $C_3$ and $C_4$ are restored to the by-pass mode. In order to prevent the signal monitoring device $W_1$ of the next terminal ($S_{i+1}$) from being turned off, the condition T hold 2 < T off 1 is further required.

If there is any abnormality in the communication apparatus Si or the subsidiary transmission line $M_2$, the signal monitoring device $W_1$ is restored to the steady state but the signal monitoring device $W_2$ is not restored to the steady state. In this case, after the length of time T hold 2 from the time of closing the initially set switch $I_2$ the change-over switches $C_2$, $C_3$ and $C_4$ are restored back to the by-pass mode (to the contact points b). While no signal comes in the next terminal $S_{i+1}$ for the length of time T hold 2, the signal monitoring device $W_1$ of the terminal $S_{i+1}$ does not lower its output level to "off" if the condition T hold 2 < T off 1 is maintained.

An Example of The Circuit of the Signal Monitoring Device

An example of the circuit of the signal monitoring device will now be described with reference to FIG. 10. The illustrated circuit can be used as either the signal monitoring device $W_1$ and $W_2$ which are different from each other only in the time constants T hold, T on and T off.

The portion around the initially set switch I will first be described.

A parallel assembly comprising an inversely biased diode 1 and a resistance 2 is connected at an end thereof with a power source Vcc and at the other end with an end of a switch portion 3 of the initially set switch I. The other end of the switch portion 3 is earthed.

The output of the movable contact of the switch portion 3 is inverted by an inverter 4, and the output of the inverter 4 enters an input B of a one-shot multivibrator 5. A capacitor 6 is provided to prevent chattering.

The time constant $T_1$ of the one-shot multivibrator 5 is given arbitrarily dependent upon the values of a resistance 7 and a capacitor 8 but is determined to be equal to or larger than the length of time T hold.

The contact point of the initially set switch I is normally in contact with the power source Vcc.

Only when the power source of a terminal is turned on or when correction of a fault is finished, the initially set switch I is changed over to the earth. Then, the output level of the inverter 4 is raised and, since the B input is an up-edge trigger terminal, the output Q of the one-shot multivibrator 5 is applied to an AND gate 9 together with a pseudo data signal PDS.

The pseudo data signal is a signal similar to the data signal and an example of it is Manchester signal. The pseudo data signal is a high repetitive pulse train generated continuously in the signal monitoring device. Unlike the data signal DS from the other terminal, the pseudo data signal includes no significant data.

Therefore, the output of the AND gate 9 applies the highly repetitive pseudo data signal PDS for the length of time T hold.

The data signal DS conveyed through the transmission line enters an OR gate 10 together with the output of the AND gate 9.

The output of the OR gate 10 is connected with the D input of a D flip-flop 11. The output of the OR gate 10 and the Q output of the D flip-flop 11 are applied to an exclusive OR gate 12.

The output of the exclusive OR gate 12 is connected with the input of an OR gate 13 and a clock terminal CK of the D flip-flop 11.

The output of the OR gate 13 enters the B input of a one-shot multivibrator 14.

The time constant (or relaxation time) of the one-shot multivibrator 14 is determined by a resistance 15 and a capacitor 16. This time constant is longer than the pulse length of any of the data signal DS and the pseudo data signal PDS. Further, since the one-shot multivibrator 14 is retriggerable, the output Q remains to be at "H" level if the signal input DS or the pseudo data signal PDS enters continuously to it.

The operation of the D flip-flop 11 and the exclusive OR gate 12 will now be described.

If the Q output of the D flip-flop 11 is at "L" level and the D input thereof is at "L" level, the output of the exclusive OR gate 12 is also at "L" level.

Here, if a pulse signal comes in the D input to make its level "H", the output of the exclusive OR gate 12 is raised to "H" level to apply a clock pulse to the clock terminal CK. Since the value of the D input comes to the Q output, the level of it becomes "H". Since the two inputs become both "H", the output of the exclusive OR gate 12 becomes "L". When the level of the pulse signal is lowered from "H" to "L", the level of the D input also becomes "L". Since the Q output is at "H" level, the output of the exclusive OR gate 12 is raised to "H" level, the clock CK is operated, and the Q output is lowered to "L" level. In this manner, the pulse of the D input appears at the Q output of the D flip-flop with a slight delay. Each time the pulse changes from "H" to "L" or from "L" to "H", the output of the exclusive OR gate 12 is raised to "H" level only for a small length of time. That is, at the exclusive OR gate there appears a short pulse train having a repetition twice that of the input of the D flip-flop. Since this pulse train enters the B input of the one-shot multivibrator 14, the output Q of the one-shot multivibrator 14 becomes "H" for a predetermined length of time from the rise of the pulse. If there is no input of the signal DS and the initially set switch I is closed, the output Q of the one-shot multivibrator 14 remains at "H" level for the length of time T hold.

Reference numeral 17 denotes a four-bit presettable counter. Preset input terminals A, B, C and D of the presettable counter 17 are applied to the power source Vcc through four resistances 15, respectively. This sets the length of time T on by connecting the preset terminals A, B, C and D with the earth E at time setting terminals 19, respectively. A time measuring reference clock CLK is normally applied to the clock input CK of the counter 17. It lowers a load terminal LD of the counter 17 to "L", and the present input is read at the moment of the rise of the clock input CK. While the counter 17 is a four-bit counter having four outputs, these output terminals are not shown in the drawings because they are not used. When all of these outputs become "H" in level, the carrier output CA becomes "H". This output only is used. From the time when the preset inputs A, B, C and D are set at the counter by the load signal LD, the counter starts counting by the clock signal CLK. Supposing that each of the preset input terminals A, B, C and D represents a "1" when earthed and a "0" when applied to the power source Vcc, then the difference between the value of the counter when preset and the value of the counter when the carrier output becomes "H" can be represented by DCBA in the binary system. Accordingly, the length of time T on can be determined freely as the product of the binary DCBA and one period of the clock CLK.

A counter 21 for determining the length of time T off is a four bit presettable counter of the same construction as the counter 17, in which a clock input terminal CK receives a pulse from a time measuring reference clock CLK. Preset input terminals A, B, C and D are applied to the power source Vcc through resistances 22. In a time setting terminal 23, arbitrary input terminals are earthed. Supposing also that each of the preset input terminals represents a "1" when earthed and a "0" when applied to the power source Vcc, then the length of time from the moment of presetting to output of a carry output CA is equal to the product of the binary DCBA and one period of the clock CLK. This defines the length of time T off.

Outputs Q and $\overline{Q}$ of the one-shot multivibrator 14 provides the condition to be described below.

As described above, the outputs of the one-shot multivibrator 14 remain Q="H" and $\overline{Q}$="L" for the length of time T hold from the moment the initially set switch I is closed.

Further, even when the initially set switch I is open, if the signal input DS is present a highly repetitive pulse is formed by the D flip-flop 11 and the exclusive OR gate 12, to maintain the outputs of the one-shot multivibrator 14 at Q="H" and $\overline{Q}$="L". When the signal input DS is not present and the initially set switch I remains open, the outputs of the one-shot multivibrator 14 are Q="L" and $\overline{Q}$="H".

The Q output of the one-shot multivibrator 14 is connected with terminals $E_T$ and $E_P$ of the counter 17 for setting the length of time T on and, on the other hand, with one input of a NOR gate 24. The $\overline{Q}$ output is connected with terminals $E_T$ and $E_P$ of the counter 21 for setting the length of time T off and also with one input of a NOR gate 20. The other input of each of the NOR gates 20 and 24 is connected with the output of a NOR gate 25. The carry outputs CA of the counters 17 and 21 go to two inputs of the NOR gate 25. The carry output CA of the counter 21 for the length of time T off is connected with a clear input CL of a D flip-flop 27 through an inverter 26. The carry output CA of the counter 17 for the length of time T on is connected with the clock input CK of the D flip-flop 27.

An output D of the D flip-flop 27 is connected with the power source Vcc through a resistance 28. An output Q of the D flip-flop 27 provides a control output signal CS by which the change-over switches $C_1$ to $C_4$ are changed. The change-over switches $C_1$ and $C_2$ to $C_4$ are changed to the contact points a when the control output signal CS is "H" and to the contact points b when the control output signal CS is "L".

Supposing that the outputs of the one-shot multivibrator 14 are changed at a moment from Q="L" and $\overline{Q}$="H" to Q="H" and $\overline{Q}$="L" and that the control output signal CS is "L", then the counter 21 for the length of time T off does not start counting because the terminals ET and EP are both "L". Accordingly, the carry output CA remains at "L". At this time, the action of the counter 17 for the length of time T on is important. In the one-shot multivibrator 14, since the output $\overline{Q}$ becomes "L" and the load input LD falls to "L", the values of the preset inputs A, B, C and D are preset in the counter 17. Further, since the enabling terminals $E_T$ and $E_P$ become both "H", count is started. Starting from the predetermined binary DCBA, the counted number increases by one for each reference clock CLK, and the count is continued until all the output four bits become "H". This is equal to the length of time T on. When the output becomes "H", the carry output CA changes from "L" to "H".

Since the carry output CA changes, a clock pulse enters the clock input CK of the D flip-flop 27 and the D input ("H") goes to the Q output. The Q output changes from "L" to "H". That is, the control output signal CS rises from "L" to "H", whereby the movable contact points of the change-over switches $C_1$ to $C_4$ are changed from the contact points b to the contact points a.

The carry output CA, on the other hand, goes to the OR gate 25 and applies a load signal to the load terminal LD through the NOR gate 20. In the counter 17 for the length of time T on, the load terminal LD becomes "L", and at the moment the clock CLK comes in, the preset values are applied to the preset inputs A, B, C and D of the counter 17. Since the enabling terminals $E_T$ and $E_P$ are "H", count is restarted. When the carry output CA becomes "H" for the second time, there is no change in the D flip-flop 27 while the counter 17 is preset as in the previous time because the Q output has become "H". Thereafter, the counter 17 repeats presetting and counting. In this manner, it is understood that, if there is a data signal DS or a one-shot pulse longer than the length of time T hold generated by closing the initially set switch I, the counter 17 for "on" time raises the control output signal CS from "L" to "H" after the length of time T on and maintains it at that level.

The counter 21 for "off" time will now be described.

If the initially set switch I remains open and the data signal input DS is interrupted for some reason, then the output of the OR gate 10 and the output of the AND gate 30 become "L". Then, the output of the one-shot multivibrator 14 becomes Q="L" and $\overline{Q}$="H" after a short period of time Tw and maintains this state. Since Q="L", the counter 17 for "on" time stops counting. Since the enabling terminals $E_T$ and $E_P$ of the counter 21 for "off" time become "H" and the load input LD thereof becomes "L", the counter 21 reads in the preset value of the time setting terminal 23. Counting is started from the preset value, and when all the outputs become "H" the carry CA output is changed from "L" to "H". When the carry CA becomes "H", the output of the inverter 26 becomes "L" and the D flip-flop 27 is cleared. Since cleared, its output Q becomes "L". That is, the output signal CS for control becomes "L". The movable contacts of the change-over switches $C_1$ to $C_4$ are changed from the contact points a to b. When the carry CA becomes "H", the load terminal LD of the counter 21 is lowered to "L" through the OR gate 25 and the NOR gate 24, to read in the preset data. In this manner, the counter 21 repeats the same counting operation maintaining the state CS="L".

Figure 10:
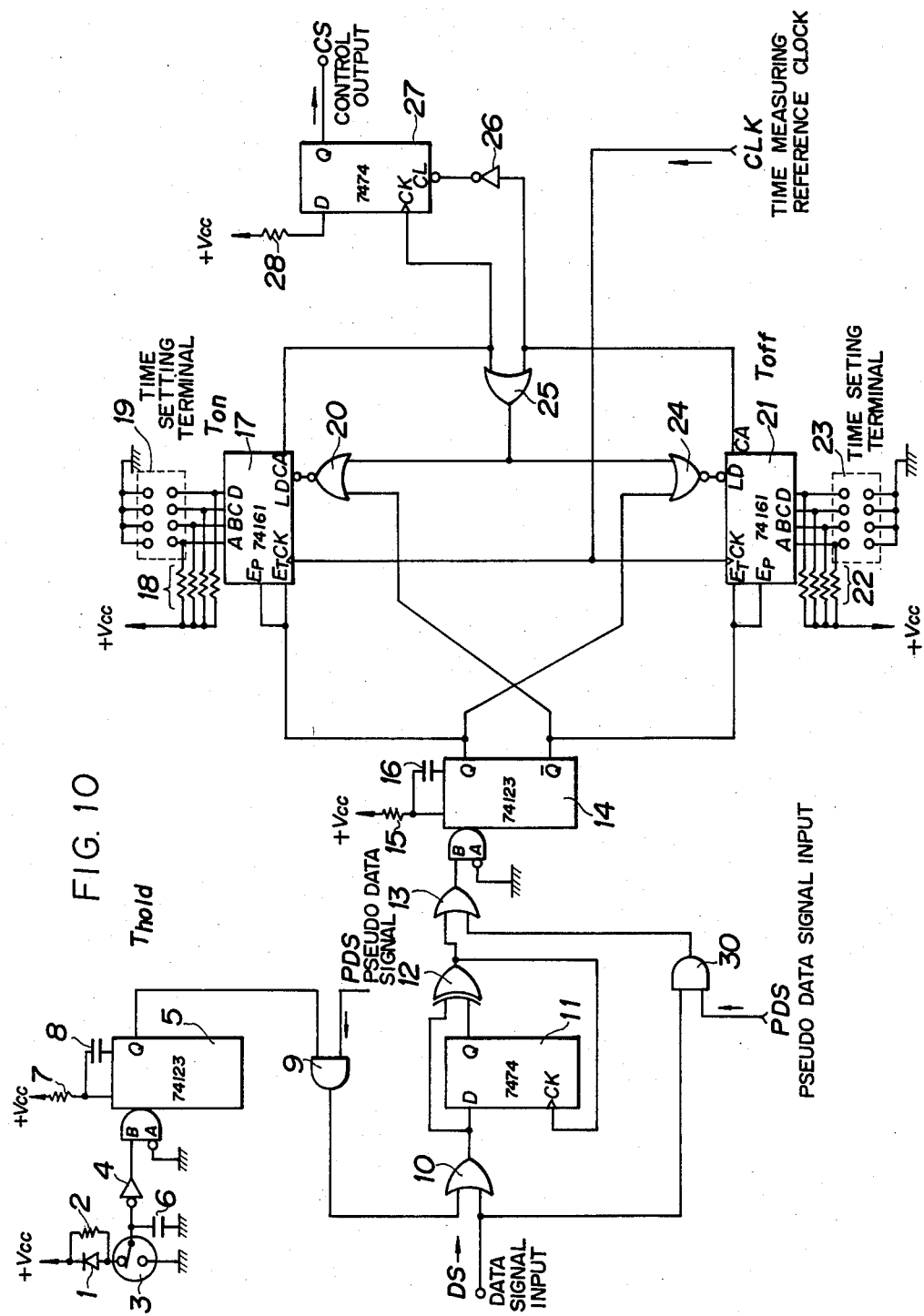
FIG. 10 is a circuit diagram of an example of the signal monitoring device.

In this manner, the circuit shown in FIG. 10 constitutes a signal monitoring device. Other electric circuits providing signal monitoring devices can exist and be easily designed.

In the example shown in FIG. 10, Texas Instruments' 74123 TTL IC is used as the one-shot multivibrator 5 and 14. This is a dual retriggerable single-shot multivibrator, halves of which can be used as the one-shot multivibrators 5 and 14, respectively.

Texas Instruments' 7474 TTL IC is used as the D flip-flops 11 and 27. This is a dual D flip-flop IC having preset and clear terminals, halves of which can be used for the D fli-flops 11 and 27, respectively.

Texas Instruments' 74161 TTL IC is used as the counters 17 and 21. This is a presettable four-bit counter having a clearing terminal.

In this circuit, other TTL IC's can be used or substituted for by CMOS IC's.

APPLICATION

The control system according to the present invention is applicable effectively to various communication systems such as LAN (Local Area Network) which has attracted special interest recently, and has a considerable importance.

Figure 11:
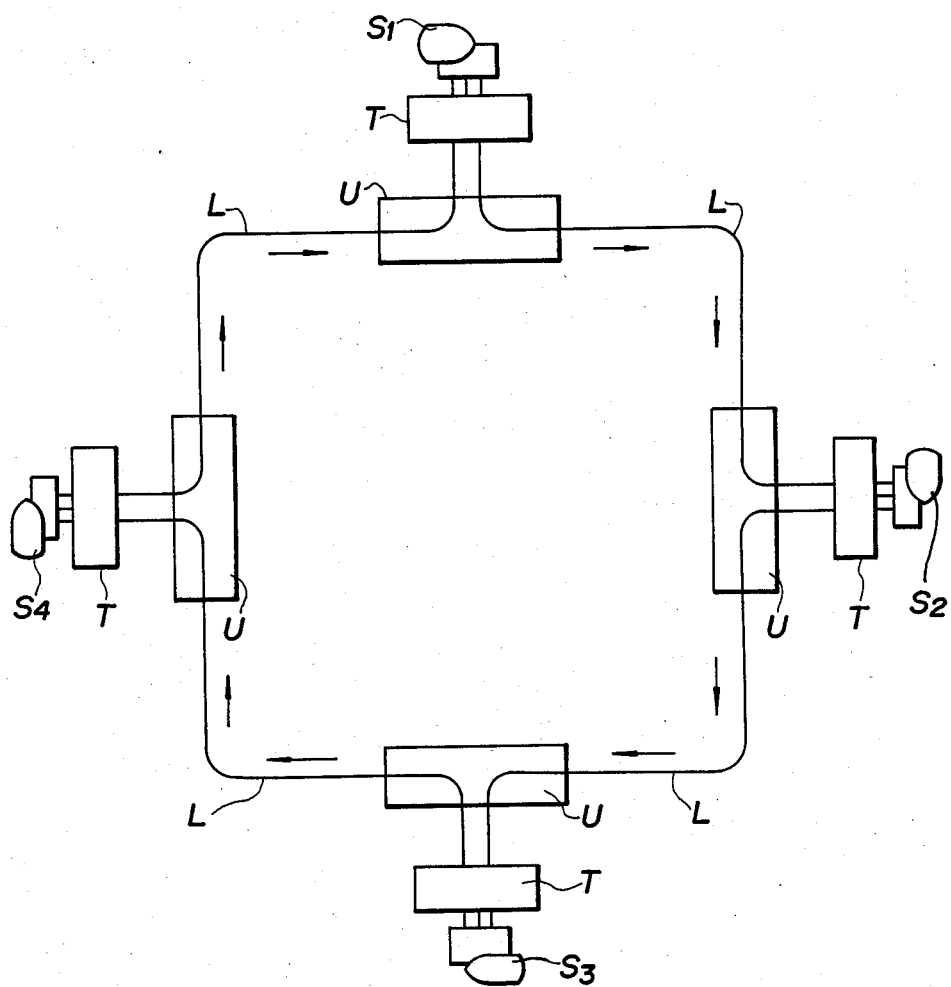
FIG. 11 is a schematic circuit diagram of the transmission control system in which an embodiment of the present invention is applied to a ring (loop) network.

FIG. 11 is a schematic block diagram of a transmission system in which the control system according to the present invention is applied to a ring (loop) network. While an example having four terminals is shown in FIG. 11, it must be understood that the number of the terminals included in the ring network is not limited to four but is arbitrary.

FIG. 12 is a schematic block diagram of a transmission system in which the control system according to the present invention is applied to a daisy chain type network, in which a terminator Te is provided at each end.

As described above, the control system according to the present invention can be applied to all linear transmission lines whether of straight type or loop type.

The control system according to the present invention can be used, for example, in control of power distribution by electric power companies or in office automation in office buildings.

ADVANTAGES

The transmission control system according to the present invention described hereinabove in detail with reference to typical examples has various advantages as follows:

(a) Circuit is simple in construction and low in cost.
 (i) Because this is a passive system monitoring only received data.
 (ii) And because no control signal is used, no additional circuit is used for generating, overlapping and separating the control signal.

(b) A highly reliable communication system can be realized.
 (i) Essentially required data signals only remain in the transmission lines.
 (ii) Various changes in situation in the transmission lines, such as fault, correction of fault, turning on or off of the power source, can be fully dealt with only in the portion concerned without affecting surrounding portions and without the need of help from the surrounding portions.
 (iii) Insertion of a terminal apparatus to the transmission line is allowed only after the terminal apparatus is confirmed to be normal by a loop back test.
 (iv) Disconnection of a terminal apparatus from the transmission line and by-passing of the transmission line do not affect the operation of the entire system.

(c) Easily applicable.
 (i) All operations other than correction of fault can be performed automatically.
 (ii) Correction of fault is done by hand of operator. This, however, is rather necessary to define the fault and is, accordingly, not a disadvantage.
 (iii) Fault can be corrected from both of the terminal side and the transmission line side.

(d) Widely applicable.
 (i) Applicable to the whole field of communication system.
 (ii) Not limited to such specific communication medium as optical fiber and copper wire.
 (iii) Not limited to any specific code of data signal.

(e) Easily set up.
 (i) Only setting of time is necessary. Special adjustment (for example, of reception level) is not necessary.
 (ii) The time can be easily changed by field and be easily set to the most suitable value for the system.

While we have shown and described specific embodiments of our invention, it will be understood that these embodiments are merely for the purpose of illustration and description and that various other forms may be devised within the scope of our invention, as defined in the appended claims.

What is claimed is:

1. A transmission line control system for controlling a transmission line having connected threto a plurality of terminal communication, comprising:
- a main transmission line for connecting said terminal communication apparatuses continuously;
- an input side subsidiary transmission line for connecting an input side section of said main transmission line with said terminal communication apparatus;
- an output side subsidiary transmission line for connecting an output side section of said main transmission line with said terminal communication apparatus;
- a by-pass for connecting the input side section of said main transmission line with the output side section thereof;
- a first change-over switch provided on said output side subsidiary transmission line for connecting said subsidiary transmission line alternatively with the output of said terminal communication apparatus or the earth;
- a second change-over switch provided on an input side section of said main transmission line, for connecting the input side section of said main transmission line alternatively with said by-pass or said input side subsidiary transmission line;
- a third change-over switch provided on a section of said main transmission line between the input side subsidiary transmission line and the output side subsidiary transmission line, for opening and closing the connection between the input side and the output side subsidiary transmission lines;
- a fourth change-over switch provided on an output side section of said main transmission line, for connecting the output side section of said main transmission line alternatively with said by-pass or said output side subsidiary transmission line;
- a first signal monitoring device for monitoring the data signal of said input side subsidiary transmission line and changing said first change-over switch when the data signal has been received continuously for a first length of time "T on 1", or for a second length of time "T hold 1" after a power source of the terminal for supplying power to said terminal communication apparatus was turned on and further for controlling the first change over switch to connect the output side subsidiary transmission line with earth when the data signal is interrupted for a length of time OFF 1 continuously; and
- a second signal monitoring device for monitoring the data signal of said output side subsidiary transmission line to change said second, third and fourth change-over switches so as to connect the input side section of said main transmission line with said input side subsidiary transmission line and said output side subsidiary transmission line with the output side section of said main transmission line and to disconnect said input side subsidiary transmission line from said output side subsidiary transmission line when receiving the data signal for a third length of time "T on 2" continuously, and to change said second, third and fourth change-over switches so as to connect the input side section and the output side section of said main transmission line with said by-pass and to connect said input side and the output side subsidiary transmission lines with each other when receiving no data signal for a fourth length of time "T off 2" continuously, in which the constants deciding the lengths of time of operation of said first and second signal monitoring devices are determined to satisfy the following inequalities:

T on 2 > T hold 1 > T on 1,

T off 1 > T off 2 > Tw where Tw denotes the largest length of time of continuous absence of signal in normal operation.

2. A transmission line control system as set forth in claim 1 above, wherein said first signal monitoring device includes a first initially set switch and changes said first change-over switch so as to connect said terminal communication apparatus with said output side subsidiary transmission line for the length of time T hold 1 since said first initially set switch was closed.

3. A transmission line control system as set forth in claim 1 above, wherein said second signal monitoring device includes a second initially set switch and changes said second, third and fourth change-over switches so as to connect the input side section of said main transmission line with said input side subsidiary transmission line and said output side subsidiary transmission line with the output side section of said main transmission line, and to disconnect said input side subsidiary transmission line from said output side subsidiary transmission line for the length of time T hold 2 since said second initially set switch was closed, and that the time constants deciding the lengths of time of operation of said first and second signal monitoring devices are determined to satisfy the following inequalities:

T off 1 > T on 1,

T hold 2 > T on 1 + T on 2.

4. A transmission line control system as set forth in claim 1 above, wherein said terminal communication apparatuses are connected with each other in a ring by said main transmission line.

5. A transmission line control system as set forth in claim 1 above, wherein said terminal communication apparatuses are connected in a straight line by said main transmission line.

6. A transmission line control system as set forth in claim 1 above, wherein said first and second signal monitoring devices include "on" time counters setting the lengths of time T on 1 and T on 2, respectively, and corresponding "off" time counters setting the lengths of time T off 1 and T off 2, respectively.

* * * * *